(12) United States Patent
Kiwaki

(10) Patent No.: US 9,370,972 B2
(45) Date of Patent: Jun. 21, 2016

(54) TIRE HAVING CIRCUMFERENTIAL GROOVE FORMED WITH ONE INTRA-GROOVE

(75) Inventor: Yukihiro Kiwaki, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 295 days.

(21) Appl. No.: 14/343,621

(22) PCT Filed: Sep. 7, 2012

(86) PCT No.: PCT/JP2012/072958
§ 371 (c)(1),
(2), (4) Date: Mar. 7, 2014

(87) PCT Pub. No.: WO2013/035857
PCT Pub. Date: Mar. 14, 2013

(65) Prior Publication Data
US 2014/0216617 A1    Aug. 7, 2014

(30) Foreign Application Priority Data

Sep. 9, 2011  (JP) ................................. 2011-197012
Sep. 9, 2011  (JP) ................................. 2011-197017

(51) Int. Cl.
*B60C 11/13*    (2006.01)
*B60C 11/04*    (2006.01)

(52) U.S. Cl.
CPC .............. *B60C 11/13* (2013.01); *B60C 11/042* (2013.04); *B60C 11/1307* (2013.04);
(Continued)

(58) Field of Classification Search
CPC   B60C 11/13; B60C 11/1307; B60C 11/1353; B60C 2011/133
See application file for complete search history.

(56) References Cited

U.S. PATENT DOCUMENTS 6,450,223 B1 * 9/2002 Landers .............. B60C 11/0306
152/209.26
2005/0126670 A1    6/2005 Godefroid
(Continued)

FOREIGN PATENT DOCUMENTS

JP    2005-170381 A    6/2005
JP    2006-151029 A    6/2006
(Continued)

OTHER PUBLICATIONS

Machine translation for Japan 2011-168164 (no date).*
(Continued)

*Primary Examiner* — Steven D Maki
(74) *Attorney, Agent, or Firm* — Sughrue Mion, PLLC

(57) ABSTRACT

A tire provided with a plurality of land portions formed by a main groove extending along a tire circumferential direction, wherein the main groove is formed with one intra-groove recessed in a tire inner direction from a surface of the main groove, the intra-groove comprises: a first circumferential groove portion extending along the tire circumferential direction on the first groove wall; a first inclined portion extending from the first groove wall toward the second groove wall on a groove bottom of the main groove; a second circumferential groove portion extending along the tire circumferential direction on the second groove wall; and a second inclined portion extending from the second groove wall toward the first groove wall on the groove bottom of the main groove.

6 Claims, 22 Drawing Sheets

(52) U.S. Cl.
CPC .... *B60C 11/1353* (2013.04); *B60C 2011/0341* (2013.04); *B60C 2011/0344* (2013.04); *B60C 2011/0346* (2013.04); *B60C 2011/0348* (2013.04); *B60C 2011/133* (2013.04)

(56) References Cited

U.S. PATENT DOCUMENTS

| | | | |
|---|---|---|---|
| 2006/0016536 A1* | 1/2006 | Maxwell | B60C 11/11 152/209.18 |
| 2006/0090828 A1* | 5/2006 | Yamane | B60C 11/0309 152/209.18 |
| 2006/0130950 A1 | 6/2006 | Murata | |

FOREIGN PATENT DOCUMENTS

| | | | |
|---|---|---|---|
| JP | 2011-116273 | A | 6/2011 |
| JP | 2011-116273 | A * | 6/2011 |
| JP | 2011-168164 | A * | 9/2011 |
| JP | 2011-168164 | A | 9/2011 |

OTHER PUBLICATIONS

Machine translation for Japan 2011-116273 (no date).*
Extended European Search Report dated Feb. 17, 2015, issued by the European Patent Office in counterpart European application No. 12830563.8.
International Search Report of PCT/JP2012/072958 dated Dec. 4, 2012, English Translation.

* cited by examiner

TIRE HAVING CIRCUMFERENTIAL GROOVE FORMED WITH ONE INTRA-GROOVE

CROSS REFERENCE TO RELATED APPLICATIONS

This is a National Stage of International Application No. PCT/JP2012/072958 filed Sep. 7, 2012, claiming priority based on Japanese Patent Application Nos. 2011-197012 filed Sep. 9, 2011 and 2011-197017 filed Sep. 9, 2011, the contents of all of which are incorporated herein by reference in their entirety.

TECHNICAL FIELD

The present invention relates to a tire provided with a plurality of land portions formed by a main groove extending along a tire circumferential direction, in which the land portions include a first land portion having a first groove wall forming the main groove and a second land portion having a second groove wall forming the main groove.

BACKGROUND ART

Conventionally, in a pneumatic tire (hereinafter, referred to as tire) mounted on a passenger vehicle, for example, a method for forming a plurality of circumferential grooves in a tread has been widely used in order to ensure a water discharge performance on a wet road surface.

Further, there is known a tire in which a plurality of protrusions to be inclined relative to a tire circumferential direction are formed on a groove bottom of a circumferential groove in order to aggressively drain rainwater that has entered such a circumferential groove (for example, Patent Literature 1). According to such a tire, a spiral water flow is easily generated in the rainwater that has entered the circumferential grooves, resulting in the improvement of wet performance, such as the water discharge performance.

CITATION LIST

Patent Literature

[Patent Literature 1] Japanese Unexamined Patent Application Publication No. 2005-170381 (Page 3, FIG. 2)

SUMMARY OF INVENTION

In recent years, along with an introduction of an electric vehicle or a hybrid automobile in which both an internal combustion engine and an electric motor are used, a further reduction of noise generated by a tire is demanded. Further, even in an automobile mounted thereon with an internal combustion engine, along with a reduction of noise generated by the automobile itself, a further reduction of noise generated by a tire is demanded more than before. Main examples of the noise generated by a tire include a pattern noise resulting from a tread pattern (pitch noise) and a road noise resulting from an unevenness on a road surface.

Moreover, even in such latest automobiles in which the noise has been reduced, it is necessary to secure wet performance of the tire that is either equivalent to or better than that of conventional tires.

The present invention has been achieved in view of such a situation, and an object thereof is to provide a tire in which tire noise such as a pattern noise and a road noise has been reduced further while securing a water discharge performance.

A first feature of the present invention is summarized as a tire (pneumatic tire 10) provided with a plurality of land portions (land portions 30, 40) formed by a main groove (main groove 21) extending along a tire circumferential direction, wherein the land portions include a first land portion (land portion 30) having a first groove wall (groove wall 25a) forming one wall surface of the main groove, and a second land portion (land portion 40) having a second groove wall (groove wall 25b) forming the other wall surface of the main groove, the main groove is formed with one intra-groove (intra-groove 100) recessed in a tire inner direction from a surface of the main groove, the intra-groove being extended along the tire circumferential direction, the intra-groove comprises: a first circumferential groove portion (circumferential groove portion 110) extending along the tire circumferential direction on the first groove wall; a first inclined portion (inclined portion 130) extending from the first groove wall toward the second groove wall on a groove bottom of the main groove, the first inclined portion being inclined with respect to the tire circumferential direction; a second circumferential groove portion (circumferential groove portion 120) extending along the tire circumferential direction on the second groove wall; and a second inclined portion (inclined portion 140) extending from the second groove wall toward the first groove wall on the groove bottom of the main groove, the second inclined portion being inclined with respect to the tire circumferential direction, a groove width (groove width W1, for example) of the first circumferential groove portion and a groove width (groove width W2, for example) of the second circumferential groove portion are different from a groove width (groove width W3, for example) of a first inclined portion and a groove width (groove width W4, for example) of a second inclined portion, and the first circumferential groove portion, the first inclined portion, the second circumferential groove portion, and the second inclined portion are formed repeatedly along the tire circumferential direction.

According to such a tire, the intra-groove is formed in the main groove, and therefore, as compared to a case in which an intra-groove is not formed, the permissible amount of water entering the main groove from the tire tread surface can be increased, which can improve the water discharge performance.

Furthermore, according to said tire, the intra-groove has the first circumferential groove portion, the first inclined portion, the second circumferential groove portion, and the second inclined portion, and the intra-groove is formed to extend while repeatedly meandering in the tire circumferential direction and a direction inclined with respect to the tire circumferential direction. According to such a tire, the water that has entered the main groove easily takes the form of a spiral water flow due to the intra-groove, and is aggressively led in the tire circumferential direction, thereby the water discharge performance can be improved.

Moreover, according to said tire, the first circumferential groove portion is formed on the first groove wall of the first land portion, and the second circumferential groove portion is formed on the second groove wall of the second land portion, thereby a space to swell by compressive deformation can be ensured even when a ground contact pressure is exerted on the first land portion and the second land portion at the time of contact with the road surface. According to such a tire, because the first land portion and the second land portion can distribute the ground contact pressure exerted on the tread surface at the time of contact with the road surface, the tire noise generated when the first land portion and the second land portion come in contact with the road surface, particularly the road noise, can be suppressed.

Another feature of the present invention is summarized that the groove width of the first circumferential groove portion and the groove width of the second circumferential groove portion are narrower than the groove width of the first inclined portion and the groove width of the second inclined portion.

Another feature of the present invention is summarized that the groove width of the first circumferential groove portion and the groove width of the second circumferential groove portion are broader than the groove width of the first inclined portion and the groove width of the second inclined portion.

Another feature of the present invention is summarized that the intra-groove is formed across an entire circumference of the main groove.

Another feature of the present invention is summarized that the first circumferential groove portion and the second circumferential groove portion are formed in an outer side in a tread widthwise direction from a center in the tread widthwise direction of the main groove.

Another feature of the present invention is summarized that the first circumferential groove portion and the second circumferential groove portion are formed alternately along the tire circumferential direction, the first circumferential groove portion is formed at one outer side in the tread widthwise direction from the center in the tread widthwise direction of the main groove, and the second circumferential groove portion is formed at the other outer side in the tread widthwise direction from the center in the tread widthwise direction of the main groove.

According to the feature of the present invention, the tire noise such as the pattern noise and the road noise has been reduced further while securing the water discharge performance.

BRIEF DESCRIPTION OF DRAWINGS

FIG. 3 (b) is a cross-sectional view in the tread widthwise direction Tw of the pneumatic tire 10 along a B-B' line of FIG. 1.

FIG. 4 (b) is a cross-sectional view in the direction perpendicular to the extended direction of the intra-groove 100 of the pneumatic tire 10 along a D-D' line of FIG. 1.

FIG. 12 (b) is a cross-sectional view in the tread widthwise direction Tw of the pneumatic tire 10F along a B-B' line of FIG. 10.

FIG. 13 (b) is a cross-sectional view in the direction perpendicular to the extended direction of the intra-groove 1100 of the pneumatic tire 10F extends along a D-D' line of FIG. 10.

DESCRIPTION OF EMBODIMENTS

First Embodiment

Figure 1:
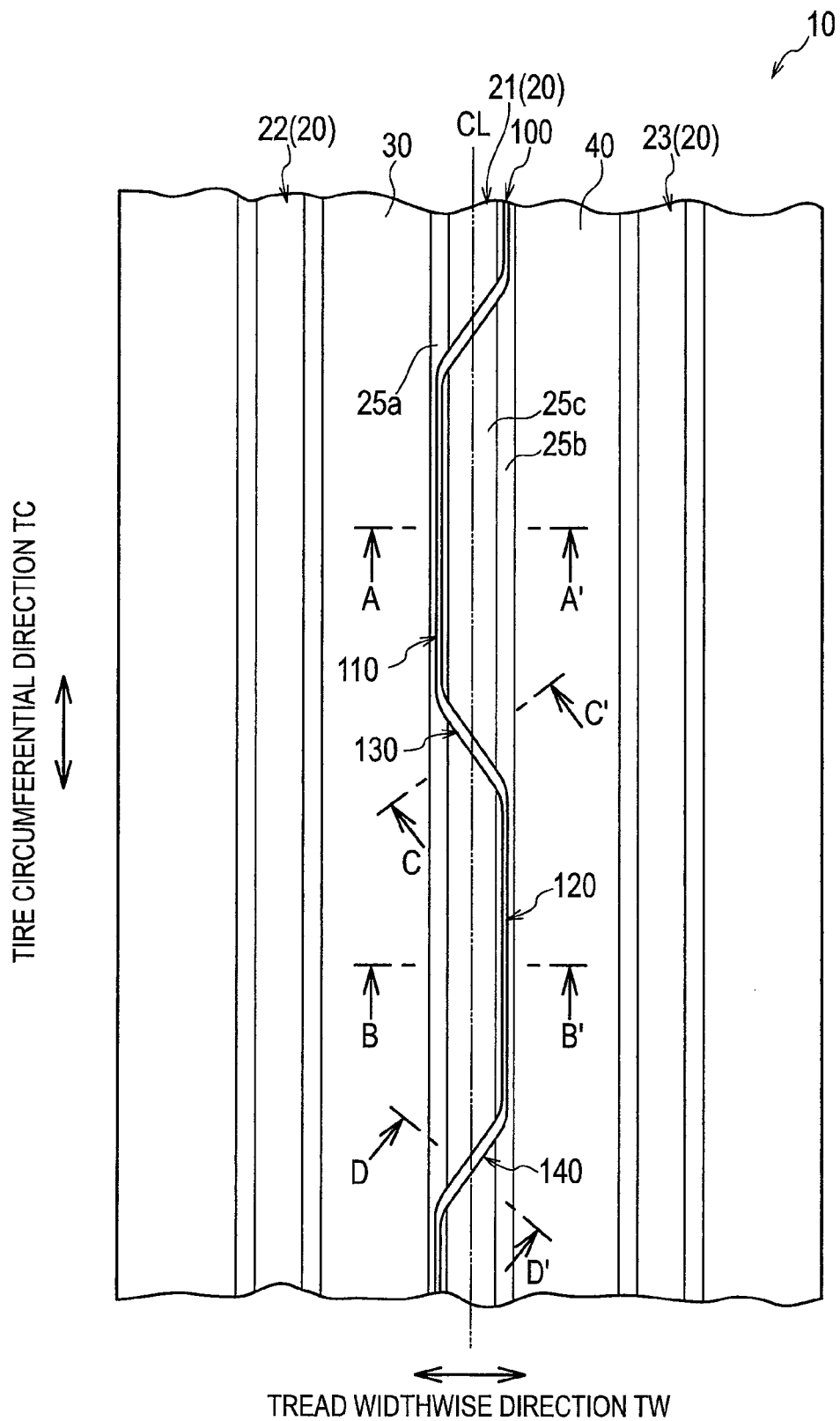
FIG. 1 is a partial exploded view of a tread portion of a pneumatic tire 10 according to an embodiment of the present invention.

Next, a first embodiment of a tire according to the present invention will be explained while referring to the drawings. In the following description of the drawings, the same or similar reference numerals are used to designate the same or similar portions. It will be appreciated that the drawings are schematically shown and the ratio and the like of each dimension are different from the real ones.

Accordingly, specific dimensions should be determined in consideration of the explanation below. Moreover, among the drawings, the respective dimensional relations or ratios may differ.

(1) Overall Schematic Configuration of Tire

Figure 2:
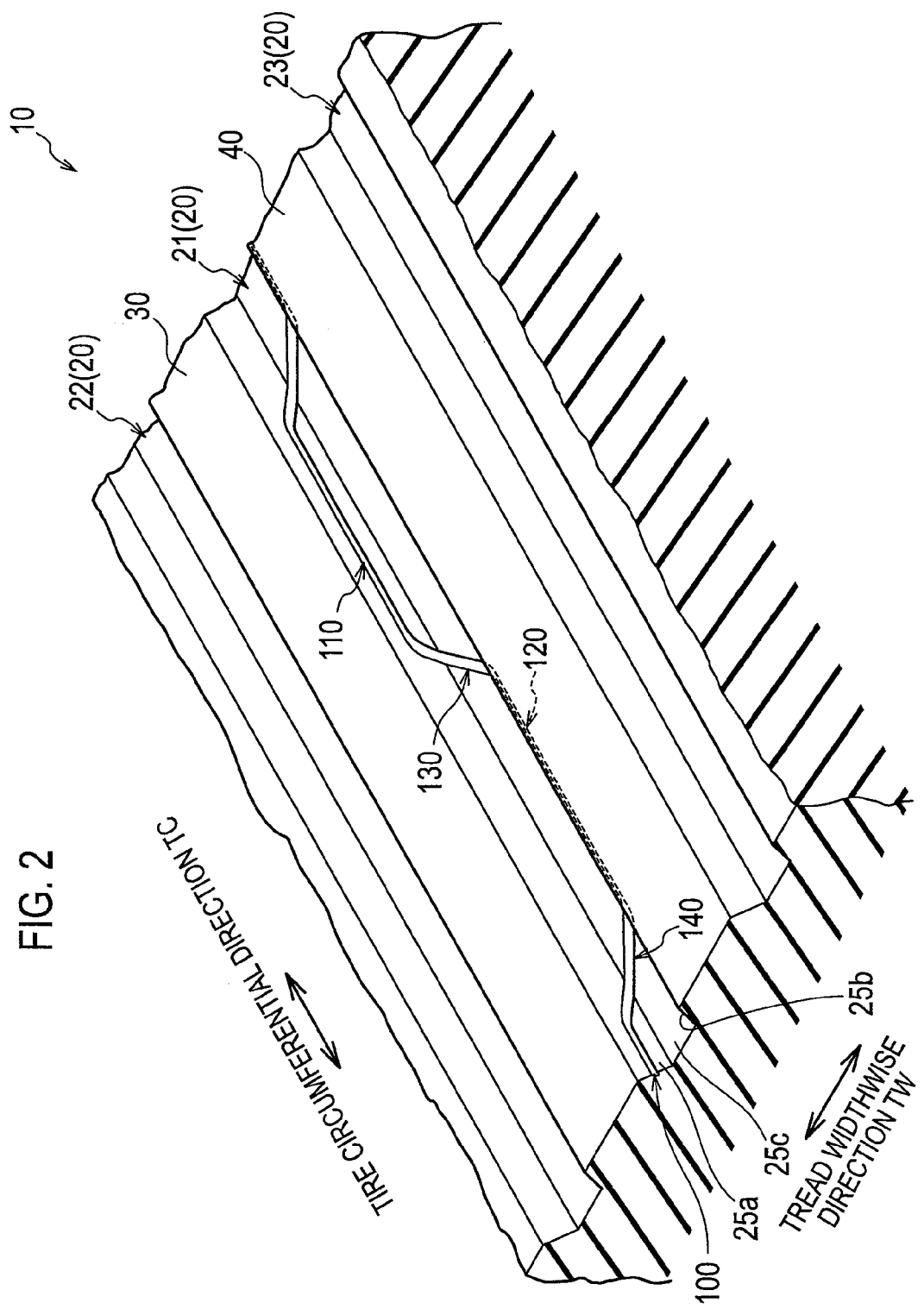
FIG. 2 is a partial perspective view of the tread portion of the pneumatic tire 10 according to the embodiment of the present invention.

FIG. 1 is a partial exploded view of a tread portion of a pneumatic tire 10 according to the present embodiment. FIG. 2 is a partial perspective view of a tread portion of the pneumatic tire 10. The pneumatic tire 10 is mainly mounted on passenger vehicles. Furthermore, the pneumatic tire 10 assembled on the rim wheel (not shown in the figure) may be filled with, rather than air, inert gas such as nitrogen gas.

A plurality of main grooves 20 extending in a tire circumferential direction Tc are formed in the pneumatic tire 10. The main groove 20 is a linear groove in a tread surface view. The main groove 20 includes a main groove 21 which is positioned in a center in a tread widthwise direction Tw and includes a tire equator CL, an outer main groove 22 positioned in one outer side in the tread widthwise direction Tw of the main groove 21, and an outer main groove 23 positioned in the other outer side in the tread widthwise direction Tw of the main groove 21. It must be noted that in the present embodiment, a case in which the center in the tread widthwise direction Tw of the main groove 21 is positioned in the tire equator CL is explained as an example, but the position of the center in the tread widthwise direction Tw of the main groove 21 is not limited thereto.

On the pneumatic tire 10, a plurality of land portions 30, 40 are formed by the main groove 20. Specifically, the land portion 30 is provided adjacently in one outer side in the tread widthwise direction Tw of the main groove 21. The land portion 30 extends in the tire circumferential direction Tc. The land portion 30 includes a groove wall 25a that forms one wall surface of the main groove 21. In the present embodiment, the land portion 30 configures a "first land portion" defined in the CLAIMS section, and the groove wall 25a configures a "first groove wall" defined in the CLAIMS section.

The land portion 40 is provided adjacently in the other outer side in the tread widthwise direction Tw of the main groove 21. The land portion 40 extends in the tire circumferential direction Tc. The land portion 40 includes a groove wall 25b that forms the other wall surface of the main groove 21. In the present embodiment, the land portion 40 configures a "second land portion" defined in the CLAIMS section, and the groove wall 25b configures a "second groove wall" defined in the CLAIMS section.

Furthermore, the main groove 21 is formed with one intra-groove 100 recessed in a tire inner direction from the surface of the main groove 21 and extended along the tire circumferential direction Tc.

In the present embodiment, the tire inner direction indicates a direction facing the inside of the tire along a normal line when the normal line is drawn on the surface of the main groove 21. Specifically, the tire inner direction in the groove wall 25a indicates an inner direction of the land portion 30 from the surface of the groove wall 25a. The tire inner direction in the groove wall 25b indicates an inner direction of the land portion 40 from the surface of the groove wall 25b. The tire inner direction in a groove bottom 25c indicates an inner side in a tire radial direction from the surface of the groove bottom 25c.

The intra-groove 100 includes a circumferential groove portion 110 formed on the groove wall 25a, an inclined portion 130 formed on the groove bottom 25c spanning across the groove wall 25a from the groove wall 25b, a circumferential groove portion 120 formed on the groove wall 25b, and an inclined portion 140 formed on the groove bottom 25c spanning across the groove wall 25a from the groove wall 25b.

The circumferential groove portion 110 extends along the tire circumferential direction Tc in the groove wall 25a. In the present embodiment, the circumferential groove portion 110 configures a "first circumferential groove portion" defined in the CLAIMS section.

The inclined portion 130 extends from the groove wall 25a toward the groove wall 25b in the groove bottom 25c of the main groove 21 so as to be at an inclination with respect to the tire circumferential direction Tc. Specifically, the inclined portion 130 extends from the groove wall 25a up to the groove wall 25b through the groove bottom 25c of the main groove. One end of the inclined portion 130 leads to the circumferential groove portion 110 formed in the groove wall 25a, and the other end of the inclined portion 130 leads to the circumferential groove portion 120 of the groove wall 25b. In the present embodiment, the inclined portion 130 configures a "first inclined portion" defined in the CLAIMS section.

The circumferential groove portion 120 extends along the tire circumferential direction Tc in the groove wall 25b. In the present embodiment, the circumferential groove portion 120 configures a "second circumferential groove portion" defined in the CLAIMS section.

The inclined portion 140 extends from the groove wall 25b toward the groove wall 25a in the groove bottom 25c of the main groove 21 so as to be at an inclination with respect to the tire circumferential direction Tc. Specifically, the inclined portion 140 extends from the groove wall 25b up to the groove wall 25a through the groove bottom 25c of the main groove. One end of the inclined portion 140 leads to the circumferential groove portion 120 formed in the groove wall 25b, and the other end of the inclined portion 140 leads to the circumferential groove portion 110 formed in the groove wall 25a. In the present embodiment, the inclined portion 140 configures a "second inclined portion" defined in the CLAIMS section.

Furthermore, the inclined portion 130 and the inclined portion 140 have a symmetrical shape. Because the inclined portion 130 and the inclined portion 140 are inclined with respect to the tire circumferential direction Tc, the inclination angle with respect to the tread widthwise direction Tw is less than 90 degrees. It must be noted that the inclination angle with respect to the tread widthwise direction Tw is preferably equal to or more than 30 degrees and less than 90 degrees, and more preferably between 45 degrees and 60 degrees.

Moreover, in the intra-groove 100, the circumferential groove portion 110, the inclined portion 130, the circumferential groove portion 120, and the inclined portion 140 are formed repeatedly along the tire circumferential direction Tc. Specifically, the circumferential groove portion 110, the inclined portion 130, the circumferential groove portion 120, and the inclined portion 140 are formed repeatedly along the tire circumferential direction Tc in a row. According to such a configuration, the intra-groove 100 is formed across the entire circumference of the main groove 21 in the pneumatic tire 10.

Furthermore, the circumferential groove portion 110 and the circumferential groove portion 120 are formed in an outer side in the tread widthwise direction from a center in the tread widthwise direction Tw of the main groove 21. Specifically, the circumferential groove portion 110 is formed in one outer side (the side of the land portion 30) in the tread widthwise direction Tw from the center in the tread widthwise direction Tw of the main groove 21, and the circumferential groove portion 120 is formed in the other outer side (the side of the land portion 40) in the tread widthwise direction from the center in the tread widthwise direction Tw of the main groove 21. Moreover, both the circumferential groove portion 110 and the circumferential groove portion 120 are formed alternately along the tire circumferential direction Tc, such that the position of both the circumferential groove portion 110 and the circumferential groove portion 120 in the tire circumferential direction Tc does not overlap each other. The detailed configuration of the intra-groove 100 will be described later.

(2) Shape of Intra-Groove 100

Figure 3:
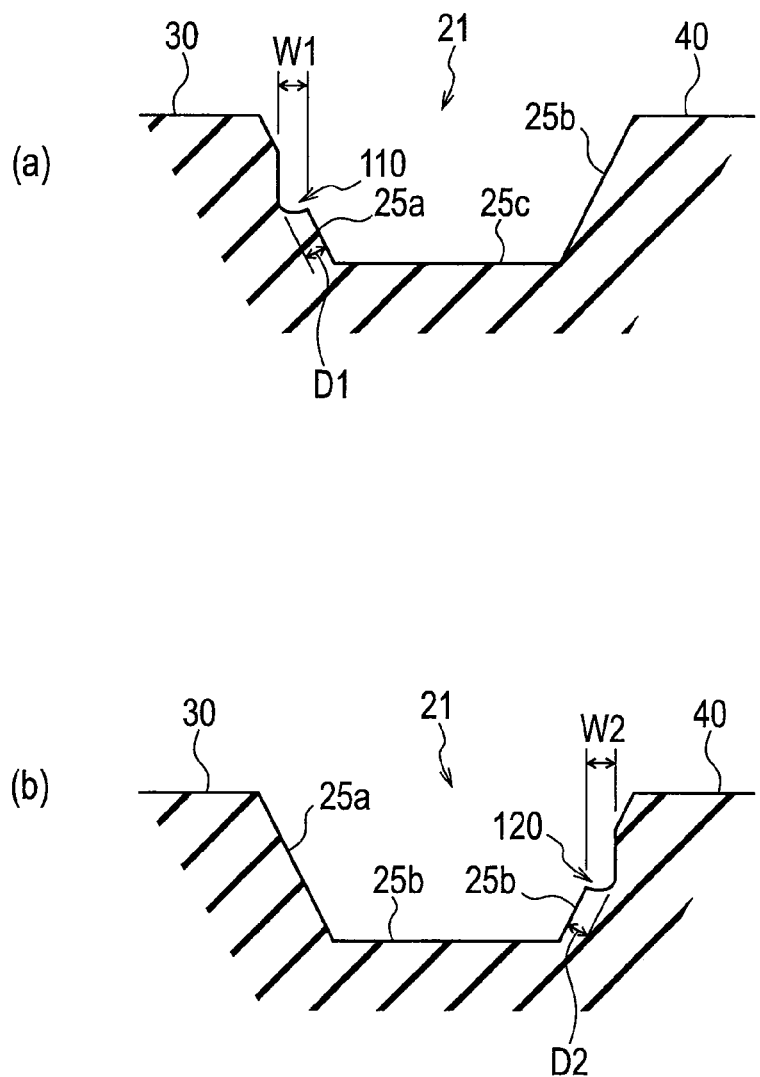
FIG. 3 (a) is a cross-sectional view in a tread widthwise direction Tw of the pneumatic tire 10 along an A-A' line of FIG. 1.
Figure 4:
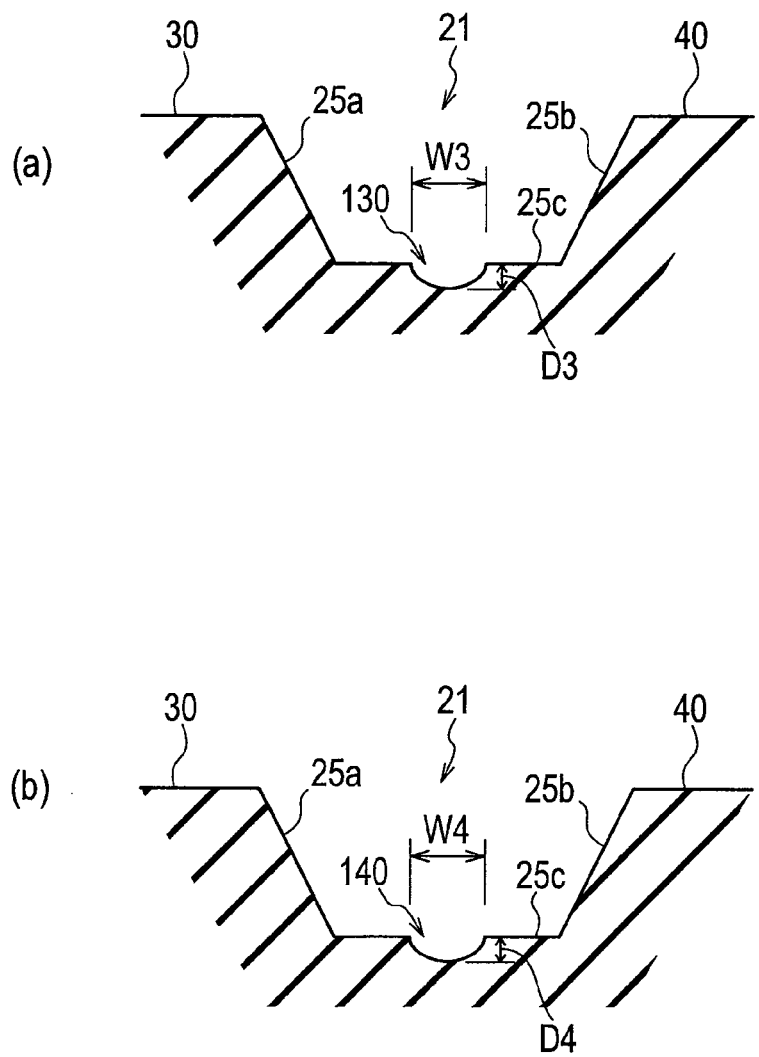
FIG. 4 (a) is a cross-sectional view in a direction perpendicular to an extended direction of an intra-groove 100 of the pneumatic tire 10 along a C-C' line of FIG. 1.

Next, the shape of the intra-groove 100 is described further with reference to FIG. 1 through FIG. 4. FIG. 3 (a) is a cross-sectional view in the tread widthwise direction Tw of the circumferential groove portion 110 along an A-A' line of FIG. 1. FIG. 3 (b) is a cross-sectional view in the tread widthwise direction Tw of the circumferential groove portion 120 along a B-B' line of FIG. 1. FIG. 4 (a) is a cross-sectional view in a direction perpendicular to an extended direction of the inclined portion 130 along a C-C' line of FIG. 1. FIG. 4 (b) is a cross-sectional view in the direction perpendicular to the extended direction of the inclined portion 140 along a D-D' line of FIG. 1.

As shown in FIG. 3 (a) and FIG. 3 (b), a groove width W1 of the circumferential groove portion 110 and a groove width W2 of the circumferential groove portion 120 are formed in the same width. Furthermore, as shown in FIG. 4 (a) and FIG. 4 (b), a groove width W3 of the inclined portion 130 and a groove width W4 of the inclined portion 140 are formed in the same width.

Furthermore, the groove width W1 of the circumferential groove portion 110 and the groove width W2 of the circumferential groove portion 120 are different from the groove width W3 of the inclined portion 130 and the groove width W4 of the inclined portion 140. Specifically, in the present embodiment, the groove width W1 of the circumferential groove portion 110 and the groove width W2 of the circumferential groove portion 120 are narrower than the groove width W3 of the inclined portion 130 and the groove width W4 of the inclined portion 140. That is, the groove width W1 of the circumferential groove portion 110, the groove width W2 of the circumferential groove portion 120, the groove width W3 of the inclined portion 130, and the groove width W4 of the inclined portion 140 satisfy the relationship $W1=W2<W3=W4$.

A maximum groove depth D1 from the groove wall 25a of the circumferential groove portion 110, and a maximum groove depth D2 from the groove wall 25b of the circumferential groove portion 120 are the same. A maximum groove depth D3 from the groove bottom 25c of the inclined portion 130, and a maximum groove depth D4 from the groove bottom 25c of the inclined portion 140 are the same.

It must be noted that the maximum groove depth D1 of the circumferential groove portion 110, the maximum groove depth D2 of the circumferential groove portion 120, the maximum groove depth D3 of the inclined portion 130, and the maximum groove depth D4 of the inclined portion 140 preferably satisfy the relationship $D1=D2 \leq D3=D4$.

The cross-sectional shape of the circumferential groove portion 110, the cross-sectional shape of the circumferential groove portion 120, the cross-sectional shape of the inclined portion 130, and the cross-sectional shape of the inclined portion 140 are preferably a curved surface shape. This is to make it difficult for the water flowing through the intra-groove 100 to take the form of a turbulent flow.

(3) Operation and Effect

According to the pneumatic tire 10 of the present embodiment, the intra-groove 100 is formed in the main groove 21, and therefore, as compared to a case in which the intra-groove 100 is not formed, the permissible amount of water entering the main groove from the tire tread surface can be increased, which can improve the water discharge performance.

Furthermore, in the pneumatic tire 10, the intra-groove 100 has the circumferential groove portion 110, the inclined portion 130, the circumferential groove portion 120, and the inclined portion 140. In the intra-groove 100, the circumferential groove portion 110, the inclined portion 130, the circumferential groove portion 120, and the inclined portion 140 are formed repeatedly along the tire circumferential direction Tc, due to which the intra-groove 100 is formed to extend while repeatedly meandering in the tire circumferential direction Tc and a direction inclined with respect to the tire circumferential direction Tc. According to such a pneumatic tire 10, the water that has entered the main groove 21 easily takes the form of a spiral water flow due to the intra-groove 100, and is aggressively led in the tire circumferential direction Tc, because of which the water discharge performance can be improved.

In the pneumatic tire 10 according to the present embodiment, the circumferential groove portion 110 and the circumferential groove portion 120 are formed in the groove wall 25a of the land portion 30 and the groove wall 25b of the land portion 40. Thus, when a ground contact pressure is exerted on the land portion 30 and the land portion 40 at the time of contact with the road surface, a space to swell by compressive deformation can be ensured. That is, according to the pneumatic tire 10 of the present embodiment, as compared to a case in which the intra-groove 100 is not formed, the compressive deformation amount at the time of contact with the road surface can be increased in the land portion 30 and the land portion 40, due to which the tire noise at the time of contact of the land portion 30 and the land portion 40 with the road surface, particularly the road noise, can be suppressed.

Thus, in the pneumatic tire 10 according to the present embodiment, the tire noise, such as the pattern noise and road noise can be reduced further while securing a water discharge performance.

In the pneumatic tire 10 according to the present embodiment, the groove width W1 of the circumferential groove portion 110 and the groove width W2 of the circumferential groove portion 120 are formed to be narrower than the groove width W3 of the inclined portion 130 and the groove width W4 of the inclined portion 140. When all of the groove widths W1 through W4 are made the same in accordance with the broader groove widths W3 and W4, the permissible amount of the water flowing into the main groove 21 from the tire tread surface can be increased, but the rigidity of the land portion 30 and the land portion 40 falls due to the formation of the circumferential groove portions 110 and 120 in the groove wall 25a of the land portion 30 and the groove wall 25b of the land portion 40. As a result, the steering stability of vehicles mounted with the pneumatic tire 10 is feared to decline.

According to the pneumatic tire 10 of the present embodiment, the groove width W1 of the circumferential groove portion 110 and the groove width W2 of the circumferential groove portion 120 are formed to be narrower than the groove width W3 of the inclined portion 130 and the groove width W4 of the inclined portion 140, and therefore, as compared to the case when all of the groove widths W1 through W4 are made the same in accordance with the broader groove widths W3 and W4, the decline in the rigidity of the land portion 30 and the land portion 40 can be suppressed. That is, according to the pneumatic tire 10, the fall of the land portion 30 and the land portion 40 can be suppressed, because of which the steering stability can be secured. Particularly, when the force in the horizontal direction (tread widthwise direction) is exerted on the pneumatic tire 10, the fall of the land portion 30 and the land portion 40 can be suppressed, because of which the decline in the cornering power is suppressed and steering stability can be secured.

Furthermore, according to the pneumatic tire 10, the intra-groove 100 is formed across the entire circumference of the main groove 21, and therefore, as compared to the case in which the intra-groove 100 is not formed across the entire circumference of the main groove 21, the occurrence of a variation in the water discharge performance at the time of rolling of the tire can be suppressed. That is, the water discharge performance of the pneumatic tire 10 can be improved no matter what the position of the tread surface that comes in contact with the road surface at the time of rolling of the tire, and then the water discharge performance of the tire as a whole can be improved.

(4) Modifications (4.1) First Modification

Figure 5:
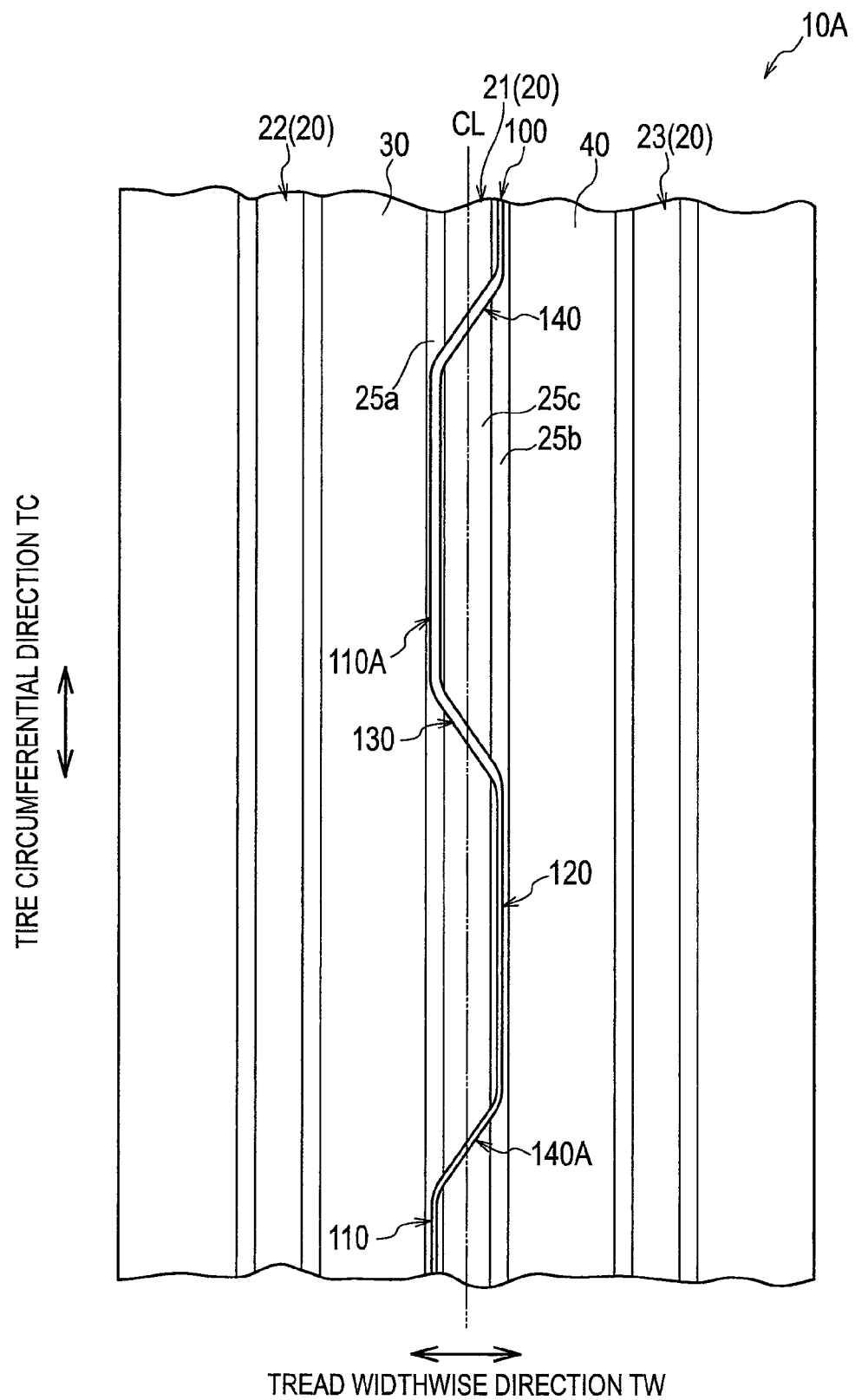
FIG. 5 is a partial exploded view of a tread portion of a pneumatic tire 10A according to a modification of the present invention.

Next, a modification according to the present embodiment will be described. FIG. 5 is a partial exploded view of a tread portion of a pneumatic tire 10A according to a first modification of the present invention. As shown in FIG. 5, the intra-groove 100 formed across the entire circumference may include, in a part thereof, a circumferential groove portion 110A having a broader groove width than the groove width W1 of the circumferential groove portion 110. Moreover, as shown in FIG. 5, the intra-groove 100 may include, in a part thereof, an inclined portion 140A having a narrower groove width than the groove width W4 of the inclined portion 140. That is, as long as the circumferential groove portion 110, the inclined portion 130, the circumferential groove portion 120, and the inclined portion 140 are formed repeatedly, the intra-groove 100 may include, in a part thereof, the circumferential groove portion 110A having a broader groove width, or the inclined portion 140A having a narrow groove width.

(4.2) Second Modification

Figure 6:
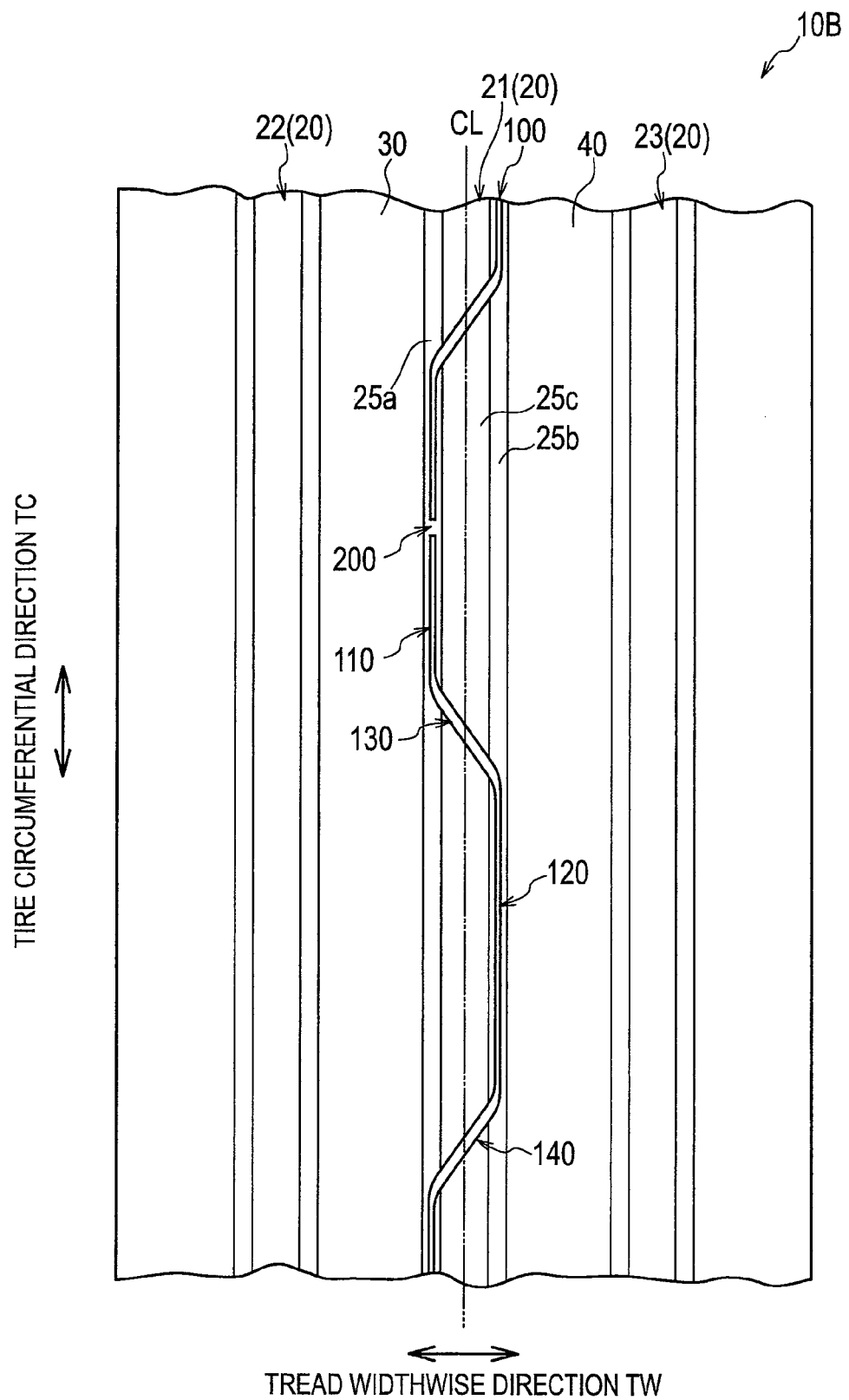
FIG. 6 is a partial exploded view of a tread portion of a pneumatic tire 10B according to a modification of the present invention.

Next, a second modification according to the present embodiment will be described. FIG. 6 is a partial exploded view of a tread portion of a pneumatic tire 10B according to the second modification of the present invention. As shown in FIG. 6, in the intra-groove 100 formed across the entire circumference, the circumferential groove portion 110 may include a segmented portion 200 that is segmented in a part thereof. That is, in the intra-groove 100, even if the circumferential groove portion 110 includes, in a part thereof, the segmented portion 200, the circumferential groove portion 110 may be formed to be connected substantially in the direction of extension thereof, in continuity. It must be noted that not only the circumferential groove portion 110, but the circumferential groove portion 120 too may include the segmented portion 200 (not shown in the figure) that is segmented in a part thereof.

(5) Other Embodiment According to the First Embodiment

As described above, the content of the present invention is disclosed through the first embodiment according to the present invention. However, it should not be interpreted that the statements and drawings constituting a part of the present disclosure limit the present invention. From this disclosure, a variety of alternate embodiments, examples, and applicable techniques will become apparent to one skilled in the art.

For example, in the above pneumatic tire 10, the main groove 21 formed at the position including the tire equator CL had the intra-groove 100, but the intra-groove 100 need not necessarily be included in the main groove formed at the position including the tire equator CL, but may be included in any type of groove as long as the groove extends in the tire circumferential direction Tc.

Figure 7:
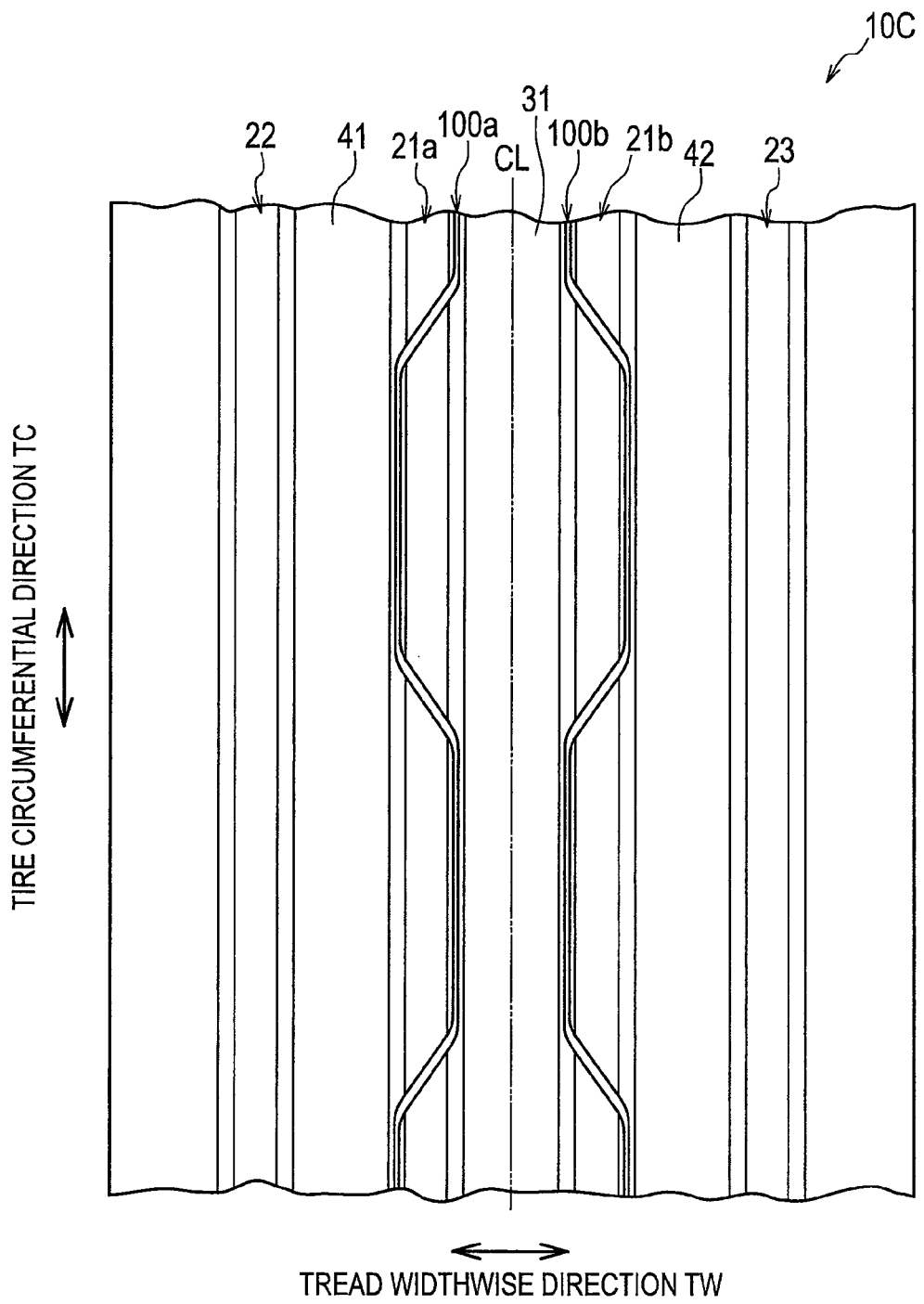
FIG. 7 is a partial exploded view of a tread portion of a pneumatic tire 10C according to another embodiment of the present invention.

Moreover, the embodiment of the present invention can be modified as follows. FIG. 7 is a partial exploded view of a tread portion of a pneumatic tire 10C according to another embodiment of the present invention.

In the pneumatic tire 10C shown in FIG. 7, intra-grooves 100a and 100b are formed in each of the plurality of main grooves 21a and 21b. The main groove 21a and the main groove 21b are formed in line symmetry with respect to the tire equator CL, and at the same time, the intra-groove 100a formed in the main groove 21a, and the intra-groove 100b formed in the main groove 21b are also formed in line symmetry with respect to the tire equator CL.

Similar to the pneumatic tire 10C according to the present embodiment, a plurality of intra-grooves 100 may be provided. It must be noted that the pneumatic tire 10C has, except for the above configuration, the other configurations which are the same as the above pneumatic tire 10. As compared to the pneumatic tire 10 according to the above embodiment, the pneumatic tire 10C according to the present embodiment has more number of intra-grooves 100, and therefore, the water discharge performance can be improved.

Furthermore, when the intra-groove 100a and the intra-groove 100b are formed in line symmetry with respect to the tire equator CL, the circumferential groove portion 110 of the intra-groove 100a, and the circumferential groove portion 110 of the intra-groove 100b are formed at the same position in the tire circumferential direction Tc of a land portion 31. As a result, the rigidity of the land portion 31 may decline remarkably.

Figure 8:
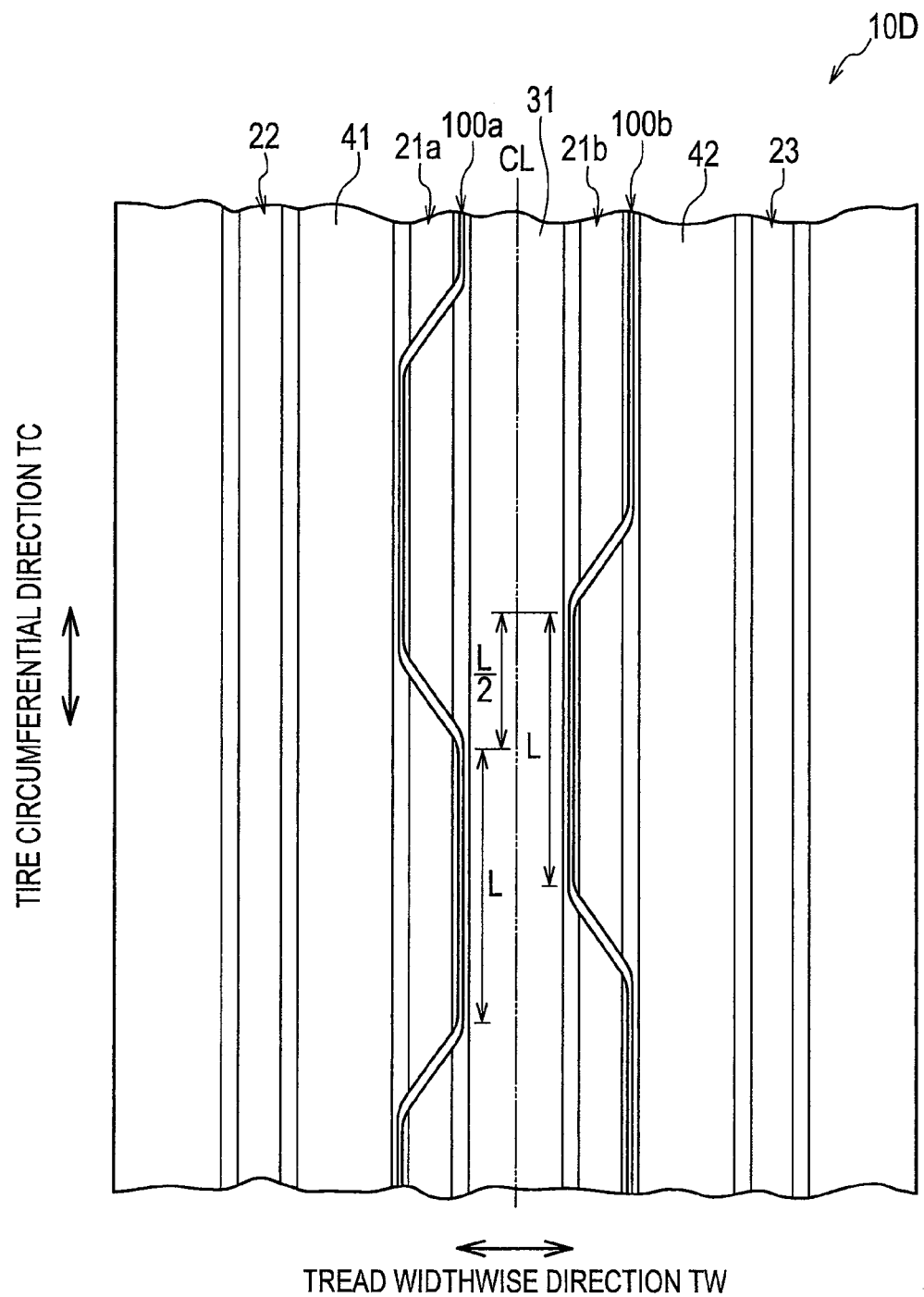
FIG. 8 is a partial exploded view of a tread portion of a pneumatic tire 10D according to another embodiment of the present invention.

FIG. 8 is a partial exploded view of a tread portion of a pneumatic tire 10D according to another embodiment of the present invention. As shown in FIG. 8, the intra-groove 100a formed in the main groove 21a, and the intra-groove 100b formed in the main groove 21b are formed with shifting by a predetermined interval in the tire circumferential direction Tc. Specifically, if the length, in the tire circumferential direction Tc, of the circumferential groove portion 110 of the intra-groove 100a is a length L, the intra-groove 100a formed in the main groove 21a, and the intra-groove 100b formed in the main groove 21b are formed with shifting by L/2 in the tire circumferential direction Tc.

As shown in FIG. 8, by forming the intra-groove 100a and the intra-groove 100b to be shifted by a predetermined interval in the tire circumferential direction Tc, the decline in the rigidity of the land portion 31 can be suppressed. As for the predetermined interval, the most appropriate interval can be accordingly decided in view of the rigidity of the land portion 31.

Figure 9:
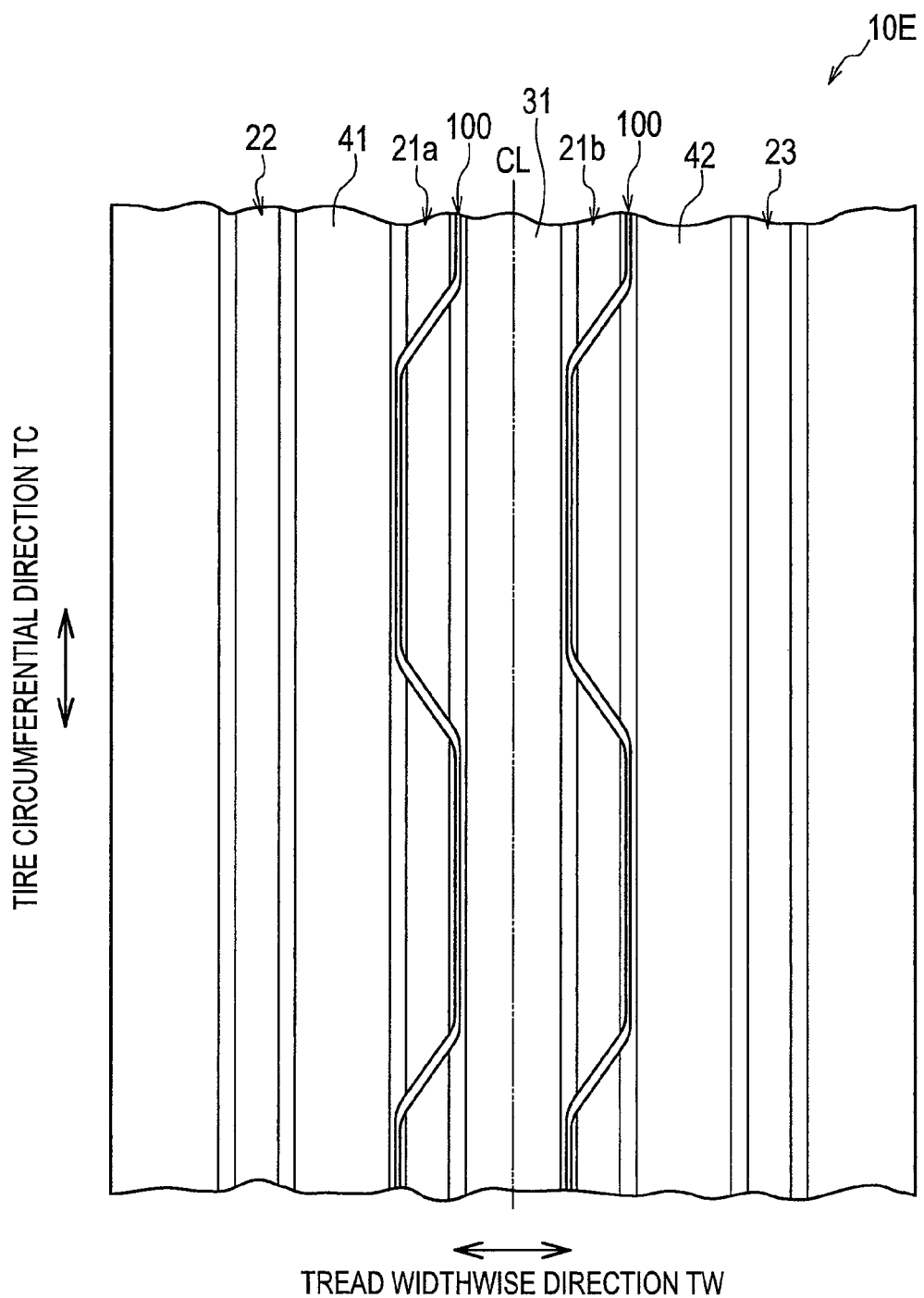
FIG. 9 is a partial exploded view of a tread portion of a pneumatic tire 10E according to another embodiment of the present invention.

FIG. 9 is a partial exploded view of a tread portion of a pneumatic tire 10E according to another embodiment of the present invention. As shown in FIG. 9, the intra-groove 100 formed in the main groove 21a, and the intra-groove 100 formed in the main groove 21b may be formed in parallel with the tire equator CL as the boundary. In such a case, the intra-groove 100a and the intra-groove 100b can be prevented from being formed at the same position in the tire circumferential direction Tc of the land portion 31, because of which the decline in the rigidity of the land portion 31 can be suppressed.

Second Embodiment

Next, a second embodiment of a tire according to the present invention will be explained while referring to the drawings. Note that the description below is based primarily on the differences from the first embodiment.

(1) Overall Schematic Configuration of Tire

Figure 10:
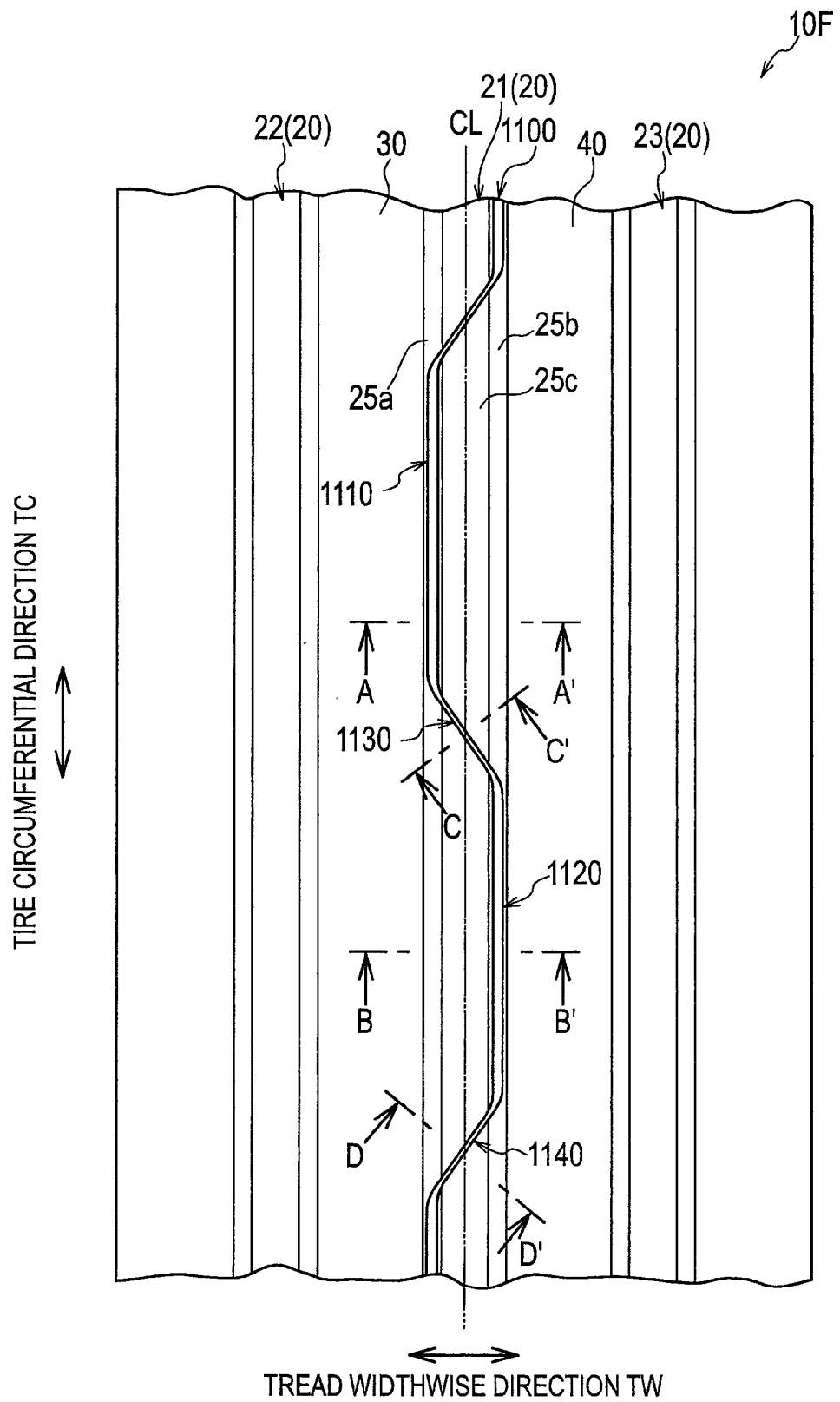
FIG. 10 is a partial exploded view of a tread portion of a pneumatic tire 10F according to a second embodiment of the present invention.
Figure 11:
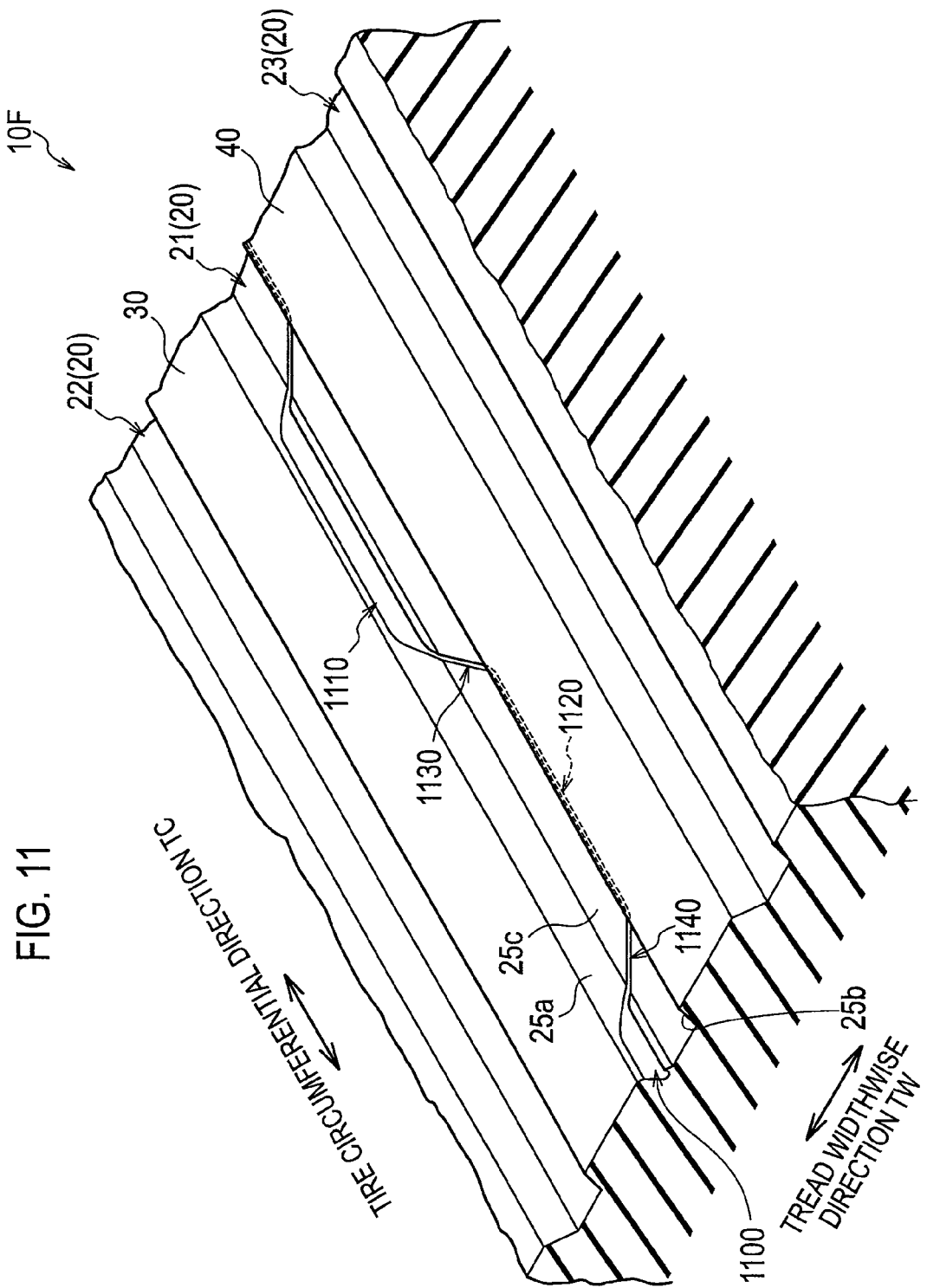
FIG. 11 is a partial perspective view of the tread portion of the pneumatic tire 10F according to the embodiment of the present invention.

FIG. 10 is a partial exploded view of a tread portion of a pneumatic tire 10F according to the present embodiment. FIG. 11 is a partial perspective view of a tread portion of the pneumatic tire 10F. The pneumatic tire 10F is mainly mounted on passenger vehicles.

A plurality of main grooves 20 extending in the tire circumferential direction Tc are formed in the pneumatic tire 10F as well. The main groove 20 is a linear groove in a tread surface view. The main groove 20 includes a main groove 21 which is positioned in a center in the tread widthwise direction Tw and includes a tire equator CL, the outer main groove 22 positioned in one outer side in the tread widthwise direction Tw of the main groove 21, and the outer main groove 23 positioned in the other outer side in the tread widthwise direction Tw of the main groove 21. Furthermore, in the main groove 21 according to the present embodiment, one intra-groove 1100 recessed in a tire inner direction from the surface of the main groove 21 is formed along the tire circumferential direction Tc.

(2) Shape of Intra-Groove 1100

Figure 12:
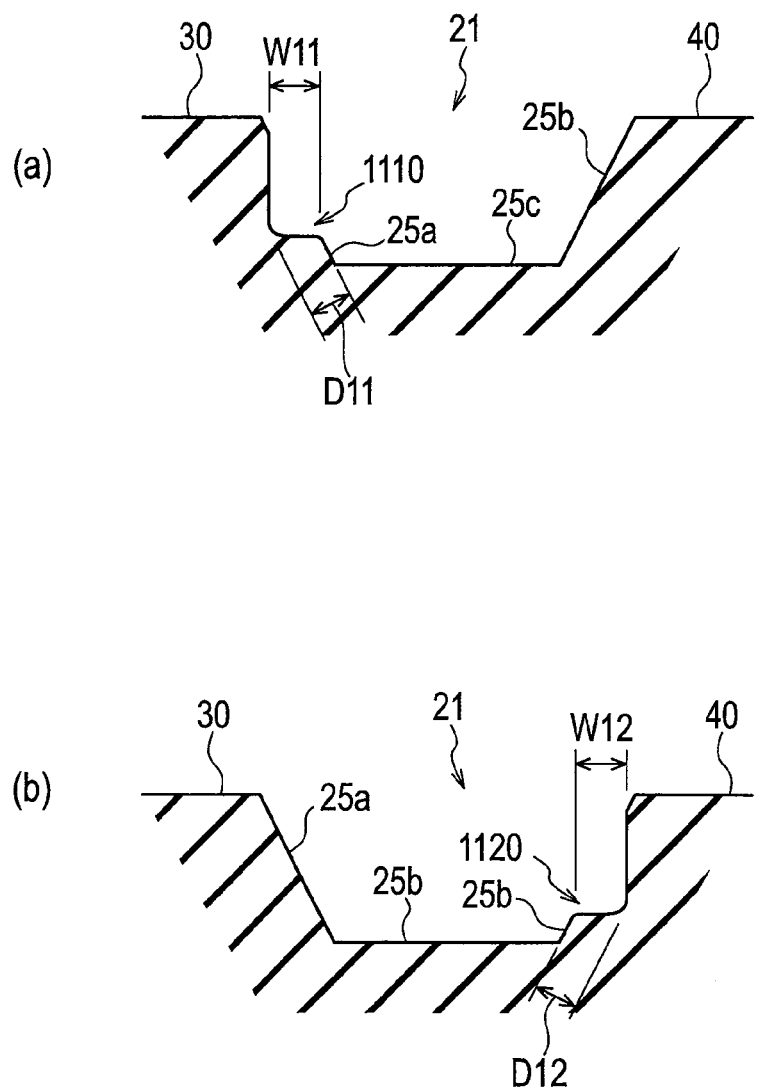
FIG. 12 (a) is a cross-sectional view in a tread widthwise direction Tw of the pneumatic tire 10F along an A-A' line of FIG. 10.
Figure 13:
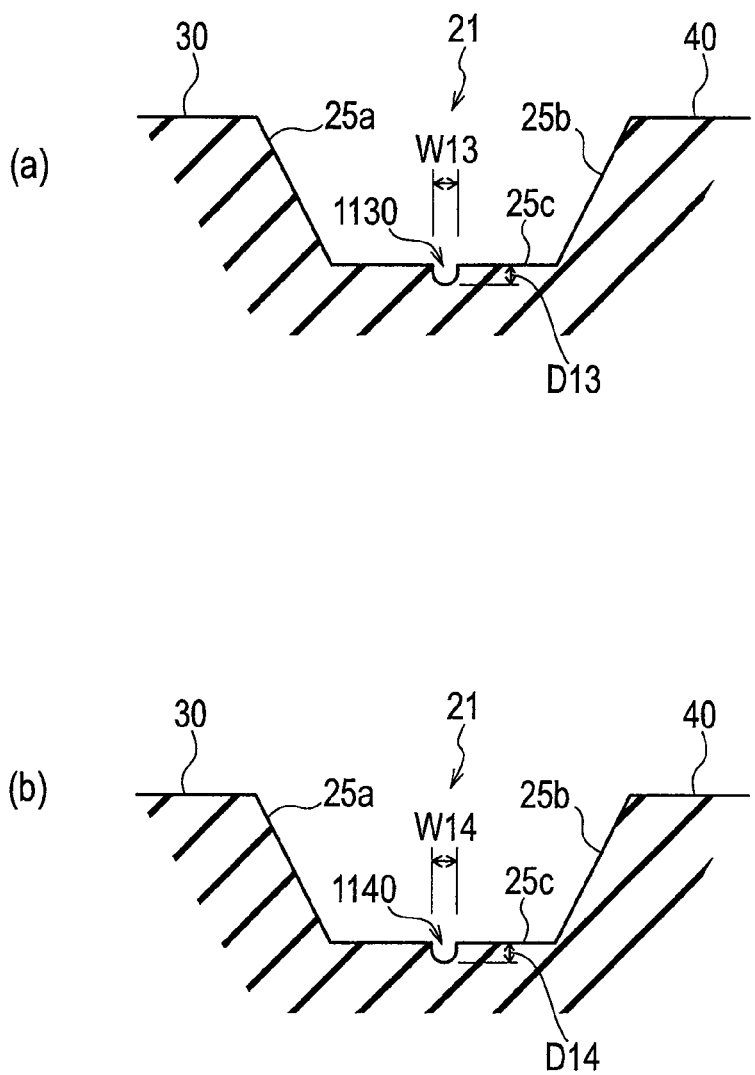
FIG. 13 (a) is a cross-sectional view in a direction perpendicular to an extended direction of an intra-groove 1100 of a pneumatic tire 10F along a C-C' line of FIG. 10.

Next, the shape of the intra-groove 1100 is described further with reference to FIG. 10 through FIG. 13. FIG. 12 (a) is a cross-sectional view in the tread widthwise direction Tw of the circumferential groove portion 1110 along an A-A' line of FIG. 10. FIG. 12 (b) is a cross-sectional view in the tread widthwise direction Tw of a circumferential groove portion 1120 along a B-B' line of FIG. 10. FIG. 13 (a) is a cross-sectional view in a direction perpendicular to an extended direction of an inclined portion 1130 along a C-C' line of FIG. 10. FIG. 13 (b) is a cross-sectional view in the direction perpendicular to the extended direction of the inclined portion 1140 along a D-D' line of FIG. 10.

As shown in FIG. 12 (a) and FIG. 12 (b), a groove width W11 of the circumferential groove portion 1110 and a groove width W12 of the circumferential groove portion 1120 are formed in the same width. Furthermore, as shown in FIG. 13 (a) and FIG. 13 (b), a groove width W13 of the inclined portion 1130 and a groove width W14 of the inclined portion 1140 are formed in the same width.

Furthermore, the groove width W11 of the circumferential groove portion 1110 and the groove width W12 of the circumferential groove portion 1120 are different from the groove width W13 of the inclined portion 1130 and the groove width W14 of the inclined portion 1140. In the present embodiment, the groove width W11 of the circumferential groove portion 1110 and the groove width W12 of the circumferential groove portion 1120 are broader than the groove width W13 of the inclined portion 1130 and the groove width W14 of the inclined portion 1140. That is, the groove width W11 of the circumferential groove portion 1110, the groove width W12 of the circumferential groove portion 1120, the groove width W13 of the inclined portion 1130, and the groove width W14 of the inclined portion 1140 satisfy the relationship W11=W12>W13=W14.

A maximum groove depth D11 from the groove wall 25a of the circumferential groove portion 1110, and a maximum groove depth D12 from the groove wall 25b of the circumferential groove portion 1120 are the same. A maximum groove depth D13 from the groove bottom 25c of the inclined portion 1130, and a maximum groove depth D14 from the groove bottom 25c of the inclined portion 1140 are the same.

It must be noted that the maximum groove depth D11 of the circumferential groove portion 1110, the maximum groove depth D12 of the circumferential groove portion 1120, the maximum groove depth D13 of the inclined portion 1130, and the maximum groove depth D14 of the inclined portion 1140 preferably satisfy the relationship D11=D12≥D13=D14.

The cross-sectional shape of the circumferential groove portion 1110, the cross-sectional shape of the circumferential groove portion 1120, the cross-sectional shape of the inclined portion 1130, and the cross-sectional shape of the inclined portion 1140 are preferably a curved surface shape. This is to make it difficult for the water flowing through the intra-groove 1100 to take the form of a turbulent flow.

(3) Operation and Effect

According to the pneumatic tire 10F of the present embodiment, the intra-groove 1100 is formed in the main groove 21, and therefore, as compared to a case in which the intra-groove 1100 is not formed, the permissible amount of water entering the main groove from the tire tread surface can be increased, which can improve the water discharge performance.

Furthermore, in the pneumatic tire 10F, the intra-groove 1100 has the circumferential groove portion 1110, the inclined portion 1130, the circumferential groove portion 1120, and the inclined portion 1140. In the intra-groove 1100, the circumferential groove portion 1110, the inclined portion 1130, the circumferential groove portion 1120, and the inclined portion 1140 are formed repeatedly along the tire circumferential direction Tc, due to which the intra-groove 1100 is formed to extend while repeatedly meandering in the tire circumferential direction Tc and a direction inclined with respect to the tire circumferential direction Tc. According to such a pneumatic tire 10F, the water that has entered the main groove 21 easily takes the form of a spiral water flow due to the intra-groove 1100, and is aggressively led in the tire circumferential direction Tc, because of which the water discharge performance can be improved.

In the pneumatic tire 10F according to the present embodiment, the circumferential groove portion 1110 and the circumferential groove portion 1120 that have a broader groove width than the inclined portion 1130 and the inclined portion 1140 are formed in the groove wall 25a of the land portion 30 and the groove wall 25b of the land portion 40. Thus, as compared to the case when all of the groove widths W11 and W12 are made the same in accordance with the narrower groove widths W13 and W14, more space to swell by compressive deformation can be ensured when a ground contact pressure is exerted at the time of contact of the land portion 30 and the land portion 40 with the road surface. In addition, as compared to the case when the groove widths W11 and W12 are made narrower than the groove widths W13 and W14, more space to swell by compressive deformation can be ensured in the land portion 30 and the land portion 40.

That is, according to the pneumatic tire 10F of the present embodiment, since the compressive deformation amount at the time of contact with the road surface can be further increased in the land portion 30 and the land portion 40, as compared to a case in which the compressive deformation amount is small, the tire noise at the time of contact of the land portion 30 and the land portion 40 with the road surface, particularly the road noise, can be suppressed.

Thus, according to the pneumatic tire 10F of the present embodiment, the tire noise such as the pattern noise and road noise can be reduced further while securing a water discharge performance.

Furthermore, according to the pneumatic tire 10F, the intra-groove 1100 is formed across the entire circumference of the main groove 21, and therefore, as compared to the case in which the intra-groove 1100 is not formed across the entire circumference of the main groove 21, the occurrence of a variation in the water discharge performance at the time of rolling of the tire can be suppressed. That is, the water discharge performance of the pneumatic tire 10F can be improved no matter what the position of the tread surface that comes in contact with the road surface at the time of rolling of the tire, the water discharge performance of the tire as a whole can be improved.

Furthermore, according to the pneumatic tire 10F, the circumferential groove portion 1110 and the circumferential groove portion 1120 are formed in an outer side in the tread widthwise direction Tw from a center in the tread widthwise direction Tw of the main groove 21. Generally, the center in the tread widthwise direction Tw of the main groove 21 is a location that largely affects the durability of the tire. Thus, from the viewpoint of securing durability, a groove having a large groove width (a groove with a large cross-sectional capacity) is preferably formed at the location including the center in the tread widthwise direction Tw of the main groove 21.

According to the pneumatic tire 10F of the present embodiment, the circumferential groove portion 1110 and the circumferential groove portion 1120 are formed in an outer side in the tread widthwise direction Tw from a center in the tread widthwise direction Tw of the main groove 21. That is, the circumferential groove portion 1110 and the circumferential groove portion 1120 are formed with excluding the center in the tread widthwise direction Tw of the main groove 21, and therefore, it is possible to form a groove having a large groove width (a groove with a large cross-sectional capacity). Thus, according to the pneumatic tire 10F, it is possible to improve the water discharge performance, and at the same time, the decline in the durability of the tread portion can be suppressed.

Moreover, the circumferential groove portion 1110 and the circumferential groove portion 1120 are formed alternately along the tire circumferential direction Tc. Furthermore, the circumferential groove portion 1110 is formed in one outer side (the side of the land portion 30) in the tread widthwise direction Tw from the center in the tread widthwise direction Tw of the main groove 21, and the circumferential groove portion 1120 is formed in the other outer side (the side of the land portion 40) in the tread widthwise direction Tw from the center in the tread widthwise direction Tw of the main groove 21. According to such a pneumatic tire 10F, the water that has entered the main groove 21 easily takes the form of a spiral water flow toward the tire circumferential direction Tc, because of which the water discharge performance can be improved further.

(4) Modifications (4.1) First Modification

Figure 14:
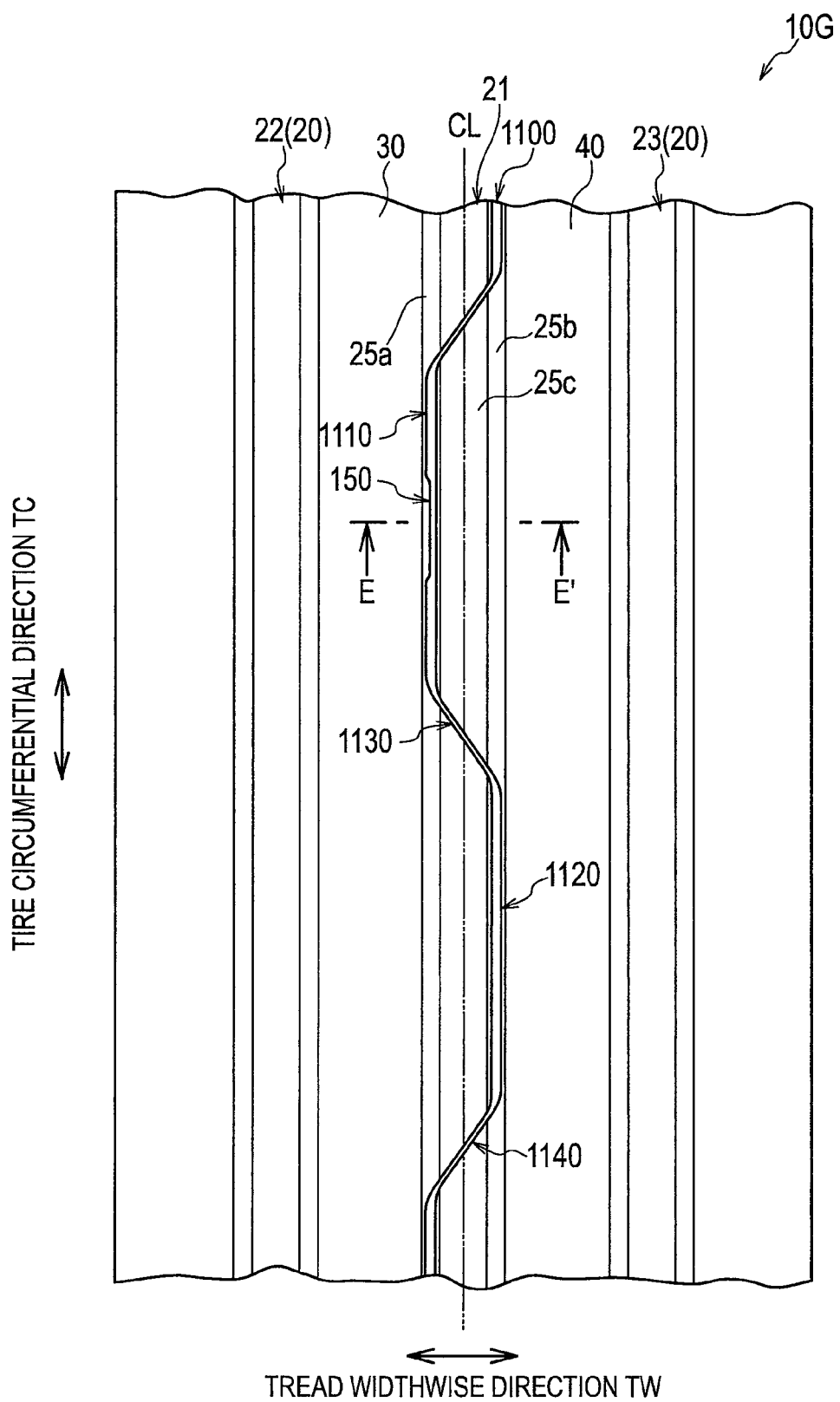
FIG. 14 is a partial exploded view of a tread portion of a pneumatic tire 10G according to a modification of the present invention.
Figure 15:
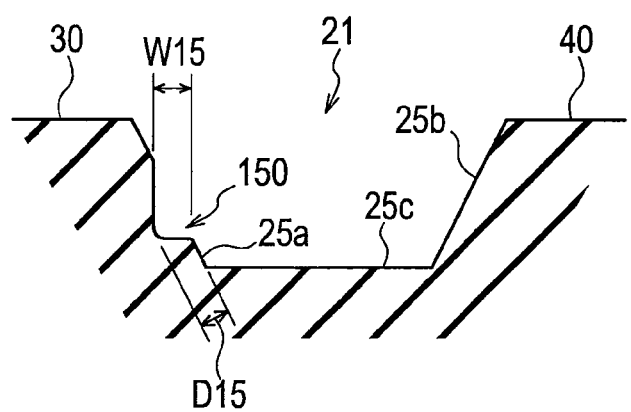
FIG. 15 is a cross-sectional view in a tread widthwise direction Tw of a pneumatic tire 10G along an E-E' line of FIG. 14.

Next, a modification according to the present embodiment will be described. FIG. 14 is a partial exploded view of a tread portion of a pneumatic tire 10G according to a first modification of the present invention. FIG. 15 is a cross-sectional view in the tread widthwise direction Tw of the circumferential groove portion 1110 along an E-E' line of FIG. 14.

As shown in FIG. 14, in the intra-groove 1100 formed across the entire circumference, the circumferential groove portion 1110 may include, in a part thereof, a narrow groove portion 150 having a narrower groove width than the groove width W11 of the circumferential groove portion 1110. It must be noted that as shown in FIG. 15, a groove width W15 of the narrow groove portion 150 preferably satisfies the relationship W11=W12≥W15>W13=W14. Furthermore, a depth D15 of the narrow groove portion 150 preferably satisfies D11=D12≥D15≥D13=D14.

According to the pneumatic tire 10G of the present modification, because the circumferential groove portion 1110 has the narrow groove portion 150, the drastic decline in the rigidity of the land portion 30 in which the circumferential groove portion 1110 is formed can be suppressed. It must be noted that in the above example, a case in which the circumferential groove portion 1110 has the narrow groove portion 150 was explained, but the circumferential groove portion 1120 may also have the narrow groove portion 150 (not shown in the figure).

(4.2) Second Modification

Figure 16:
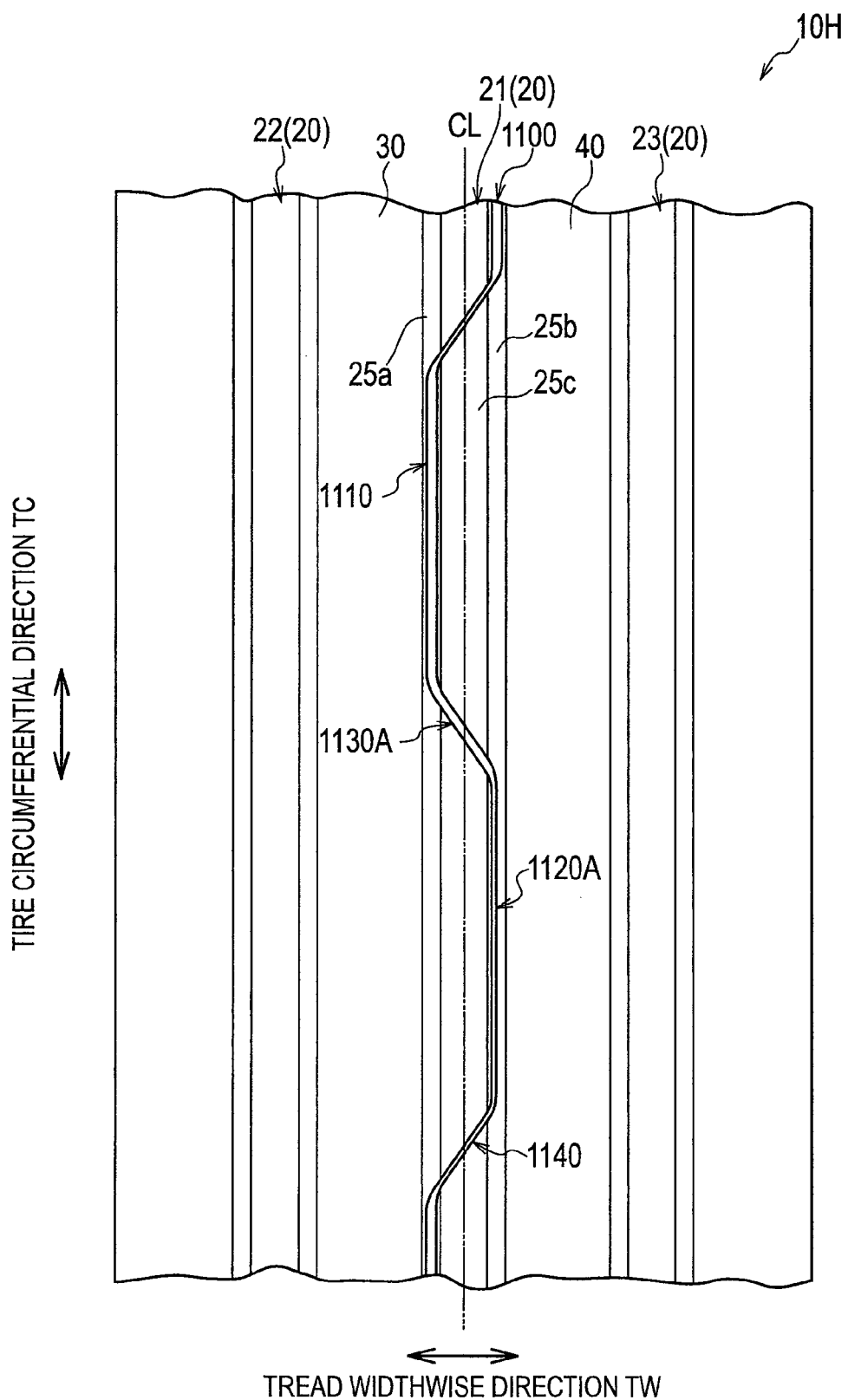
FIG. 16 is a partial exploded view of a tread portion of a pneumatic tire 10H according to a modification of the present invention.

Next, a second modification according to the present embodiment will be described. FIG. 16 is a partial exploded view of a tread portion of a pneumatic tire 10H according to the second modification of the present invention. As shown in FIG. 16, the intra-groove 1100 formed across the entire circumference may include, in a part thereof, a circumferential groove portion 1120A having a narrower groove width than the groove width W12 of the circumferential groove portion 1120. Moreover, as shown in FIG. 16, the intra-groove 1100 may include, in a part thereof, an inclined portion 1130A having a broader groove width than the groove width W14 of the inclined portion 1130. That is, as long as the circumferential groove portion 1110, the inclined portion 1130, the circumferential groove portion 1120, and the inclined portion 1140 are formed repeatedly, the intra-groove 1100 may include, in a part thereof, the circumferential groove portion 1120A having a narrow groove width, or an inclined portion 1130A having a broad groove width.

(4.3) Third Modification

Figure 17:
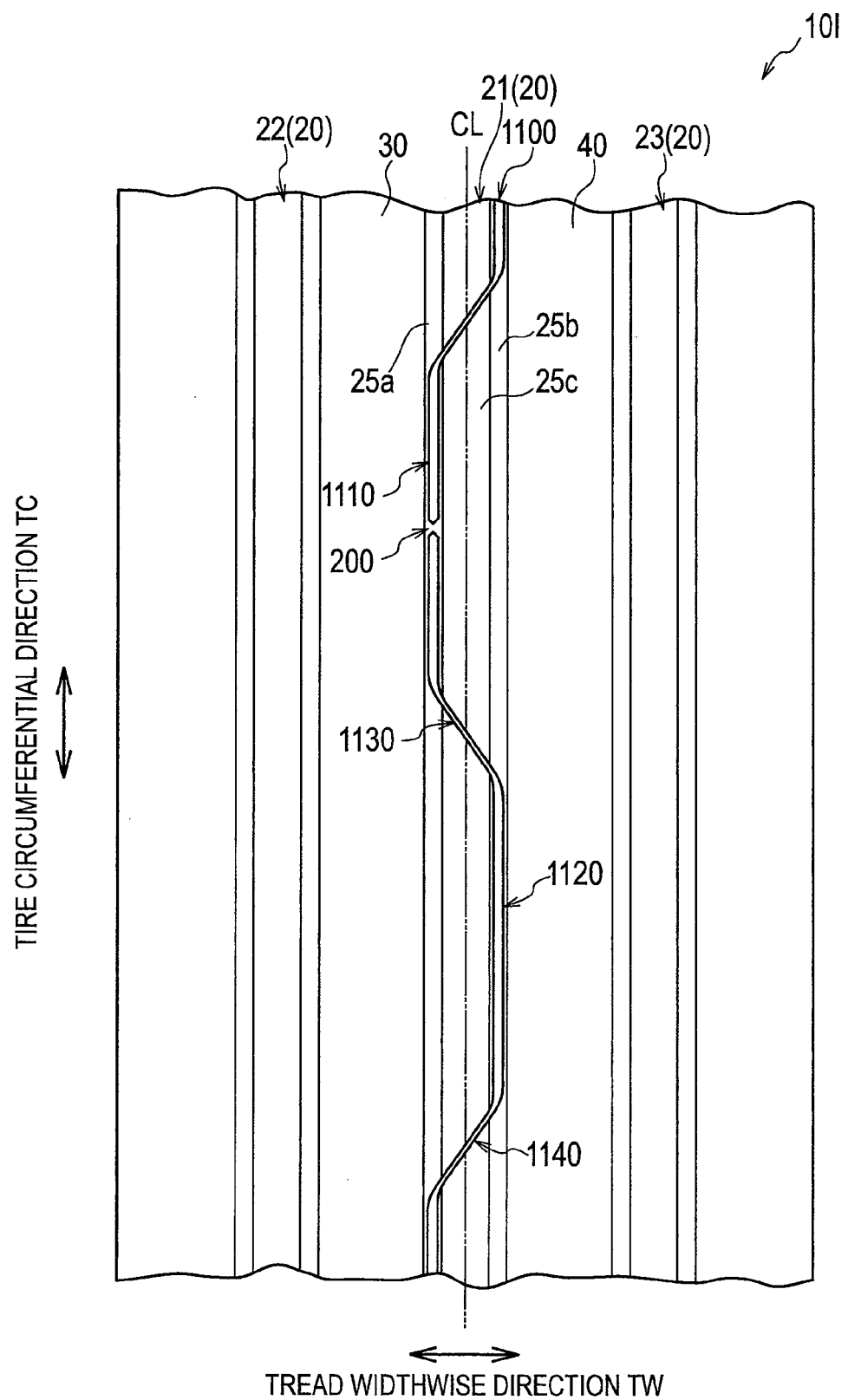
FIG. 17 is a partial exploded view of a tread portion of a pneumatic tire 10I according to a modification of the present invention.

Next, a third modification according to the present embodiment will be described. FIG. 17 is a partial exploded view of a tread portion of a pneumatic tire 10I according to the third modification of the present invention. As shown in FIG. 17, in the intra-groove 1100 formed across the entire circumference, the circumferential groove portion 1110 may include the segmented portion 200 that is segmented in a part thereof. That is, in the intra-groove 1100, even if the circumferential groove portion 1110 includes, in a part thereof, the segmented portion 200, the circumferential groove portion 1110 may be formed to be connected substantially in the direction of extension thereof, in continuity. It must be noted that not only the circumferential groove portion 1110, but the circumferential groove portion 1120 too may include, in a part thereof, the segmented portion 200 (not shown in the figure) that is segmented.

(5) Other Embodiment According to the Second Embodiment

As described above, the content of the present invention is disclosed through the second embodiment according to the present invention. However, it should not be interpreted that the statements and drawings constituting a part of the present disclosure limit the present invention. From this disclosure, a variety of alternate embodiments, examples, and applicable techniques will become apparent to one skilled in the art.

For example, in the above pneumatic tires 10G and I, the main groove 21 formed at the position including the tire equator CL had the intra-groove 1100, but the intra-groove 1100 need not necessarily be included in the main groove formed at the position including the tire equator CL, but may be included in any type of groove as long as the groove extends in the tire circumferential direction Tc.

Figure 18:
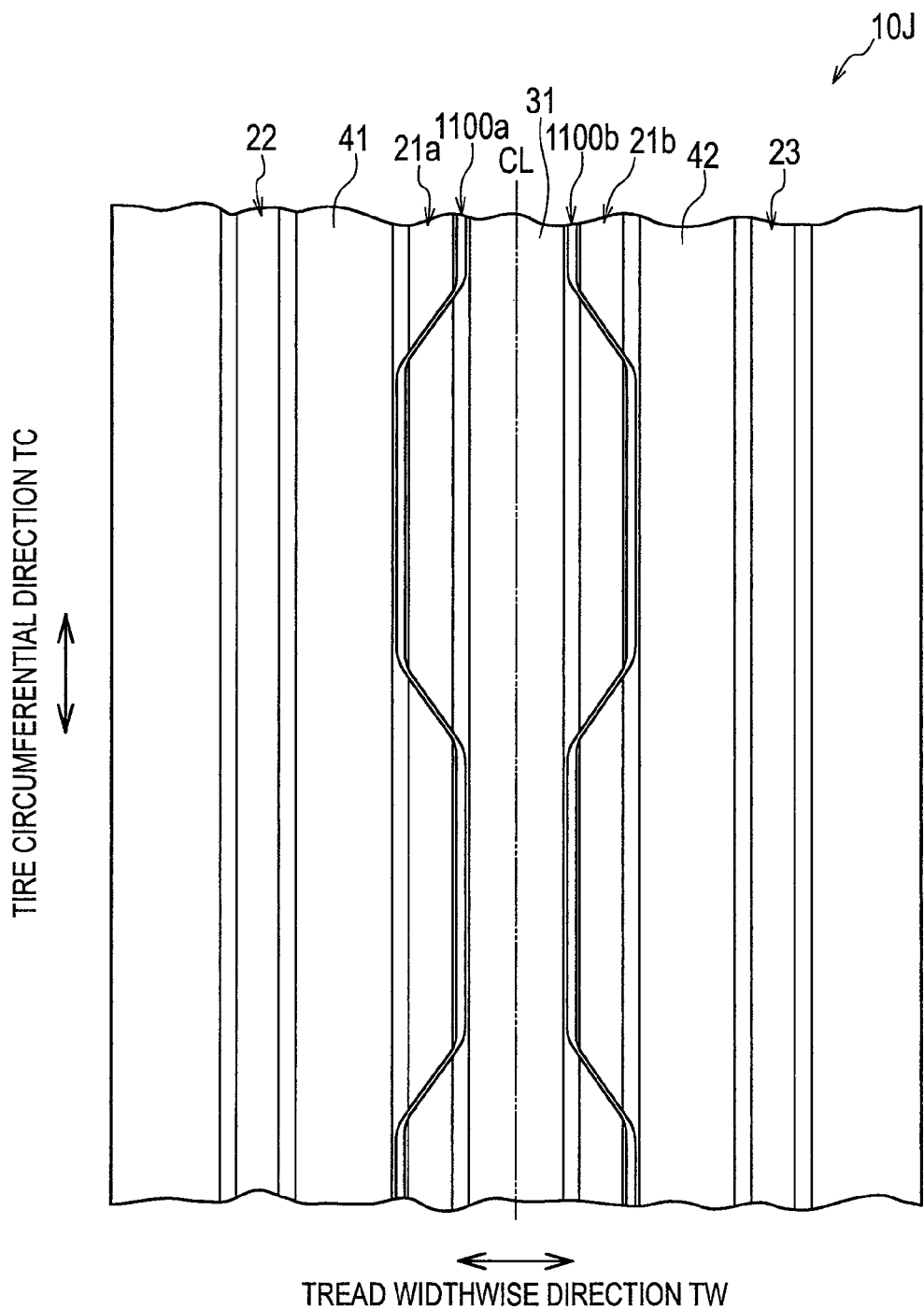
FIG. 18 is a partial exploded view of a tread portion of a pneumatic tire 10J according to another embodiment of the present invention.

Moreover, the embodiment of the present invention can be modified as follows. FIG. 18 is a partial exploded view of a tread portion of a pneumatic tire 10J according to another embodiment of the present invention.

In the pneumatic tire 10J shown in FIG. 18, intra-grooves 1100a and 1100b are formed in each of the plurality of main grooves 21a and 21b. The main groove 21a and the main groove 21b are formed in line symmetry with respect to the tire equator CL, and at the same time, the intra-groove 1100a formed in the main groove 21a, and the intra-groove 1100b formed in the main groove 21b are also formed in line symmetry with respect to the tire equator CL.

Similar to the pneumatic tire 10J according to the present embodiment, a plurality of intra-grooves 1100 may be provided. It must be noted that the pneumatic tire 10J has, except for the above configuration, the other configurations which are the same as the above pneumatic tires 10G and I. As compared to the pneumatic tires 10G and I according to the above embodiments, the pneumatic tire 10J according to the present embodiment has more number of intra-grooves 1100, and therefore, the water discharge performance can be improved.

Furthermore, when the intra-groove 1100a and the intra-groove 1100b are formed in line symmetry with respect to the tire equator CL, the circumferential groove portion 1110 of the intra-groove 1100a, and the circumferential groove portion 1110 of the intra-groove 1100b are formed at the same position in the tire circumferential direction Tc of the land portion 31. As a result, the rigidity of the land portion 31 may decline remarkably.

Figure 19:
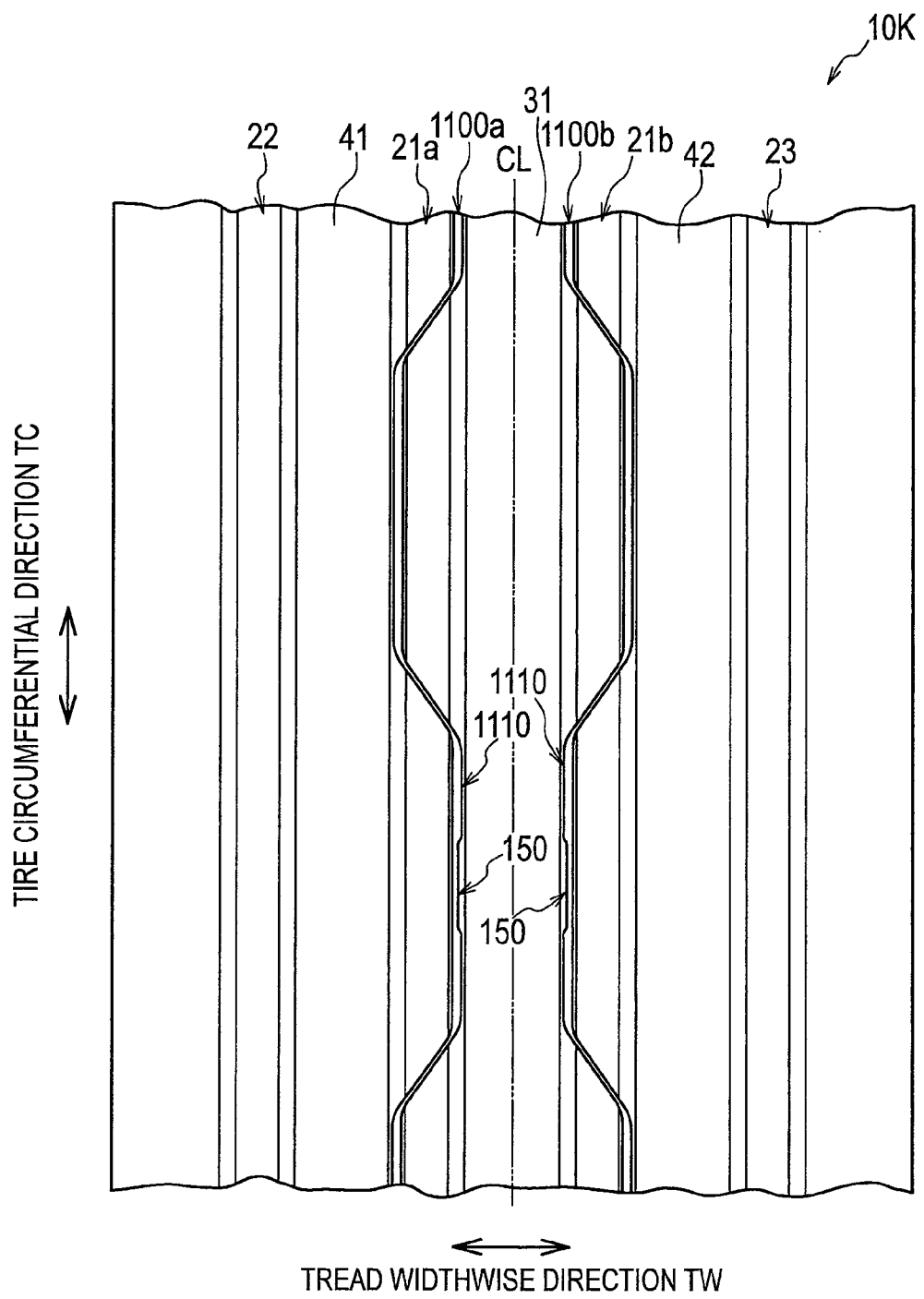
FIG. 19 is a partial exploded view of a tread portion of a pneumatic tire 10K according to another embodiment of the present invention.

FIG. 19 is a partial exploded view of a tread portion of a pneumatic tire 10K according to another embodiment of the present invention. As shown in FIG. 19, each of the circumferential groove portion 1110 of the intra-groove 1100a and the circumferential groove portion 1110 of the intra-groove 1100b may have the narrow groove portion 150. According to the pneumatic tire 10K, by forming the narrow groove portion 150, the decline in the rigidity of the land portion 31 can be suppressed.

Figure 20:
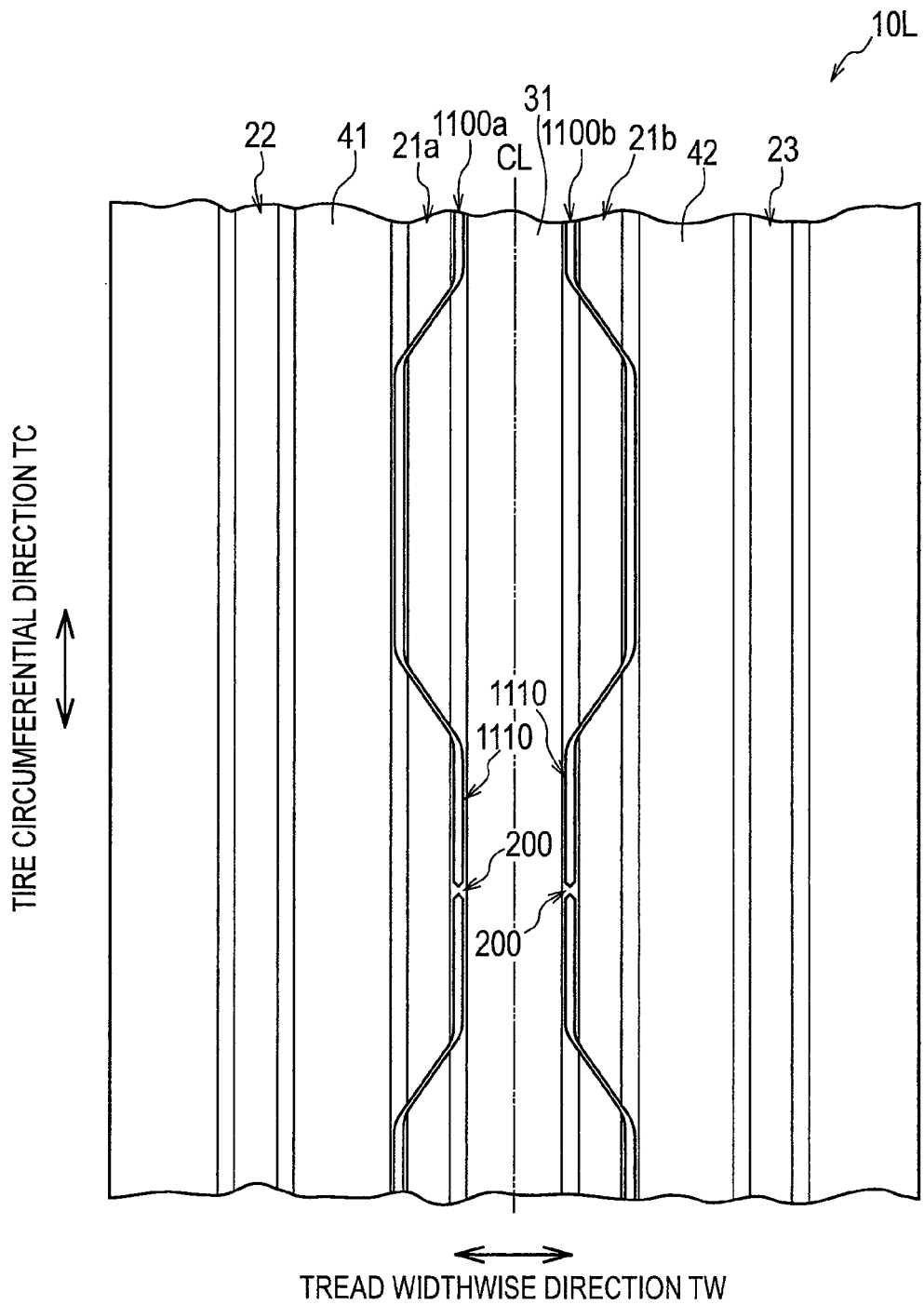
FIG. 20 is a partial exploded view of a tread portion of a pneumatic tire 10L according to another embodiment of the present invention.

In addition, FIG. 20 is a partial exploded view of a tread portion of a pneumatic tire 10L according to another embodiment of the present invention. As shown in FIG. 20, each of the circumferential groove portion 1110 of the intra-groove 1100a and the circumferential groove portion 1110 of the intra-groove 1100b may have the segmented portion 200. According to the pneumatic tire 10L, by forming the segmented portion 200, the decline in the rigidity of the land portion 31 can be suppressed.

Figure 21:
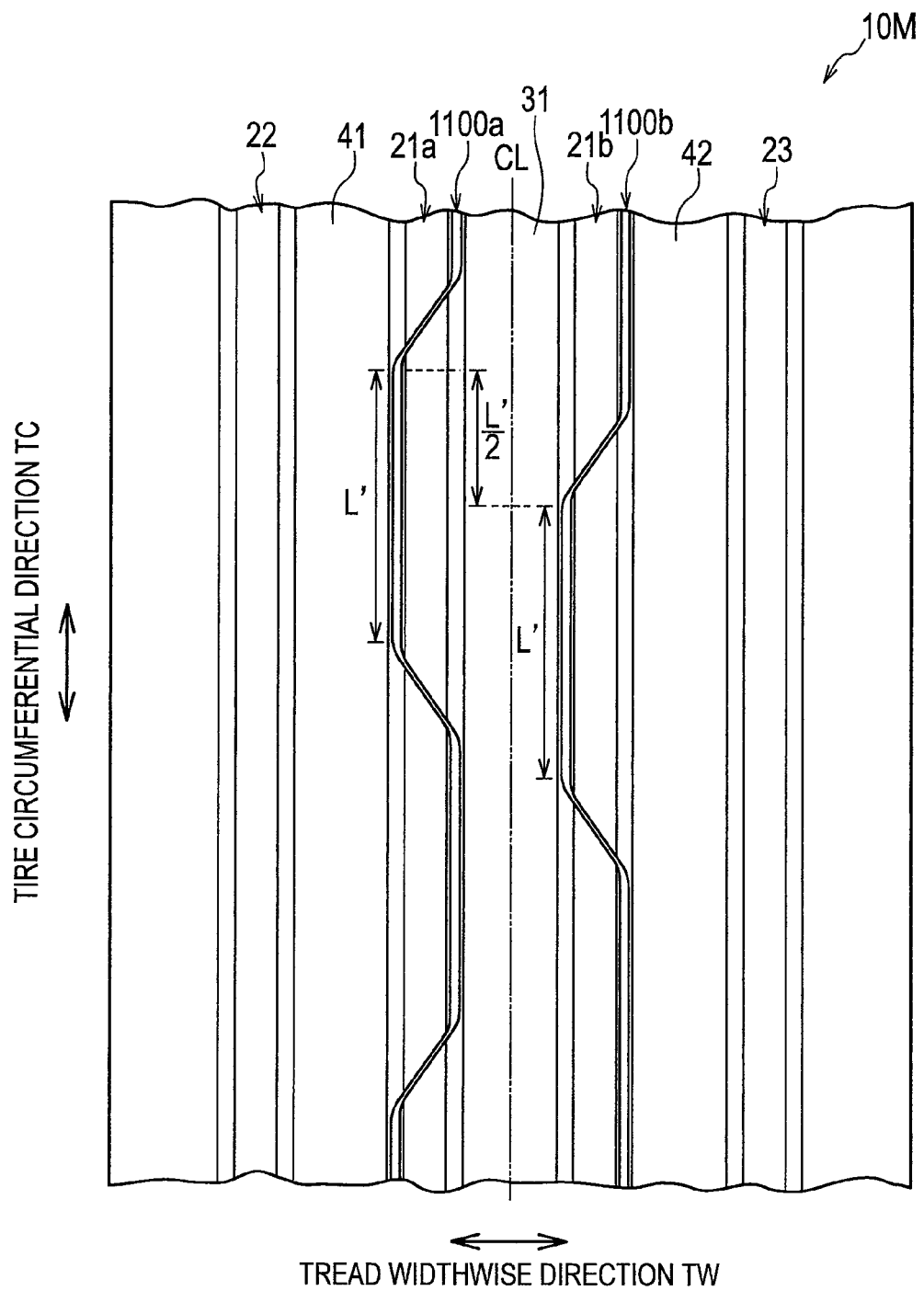
FIG. 21 is a partial exploded view of a tread portion of a pneumatic tire 10M according to another embodiment of the present invention.

In addition, FIG. 21 is a partial exploded view of a tread portion of a pneumatic tire 10M according to another embodiment of the present invention. As shown in FIG. 21, the intra-groove 1100a formed in the main groove 21a, and the intra-groove 1100b formed in the main groove 21b are formed with shifting by a predetermined interval in the tire circumferential direction Tc. Specifically, if the length, in the tire circumferential direction Tc, of the circumferential groove portion 1110 of the intra-groove 1100a is a length L', the intra-groove 1100a formed in the main groove 21a, and the intra-groove 1100b formed in the main groove 21b are formed with shifting by L'/2 in the tire circumferential direction Tc.

As shown in FIG. 21, by forming the intra-groove 1100a and the intra-groove 1100b to be shifted by a predetermined interval in the tire circumferential direction Tc, the decline in the rigidity of the land portion 31 can be suppressed. As for the predetermined interval, the most appropriate interval can be accordingly decided in view of the rigidity of the land portion 31.

Figure 22:
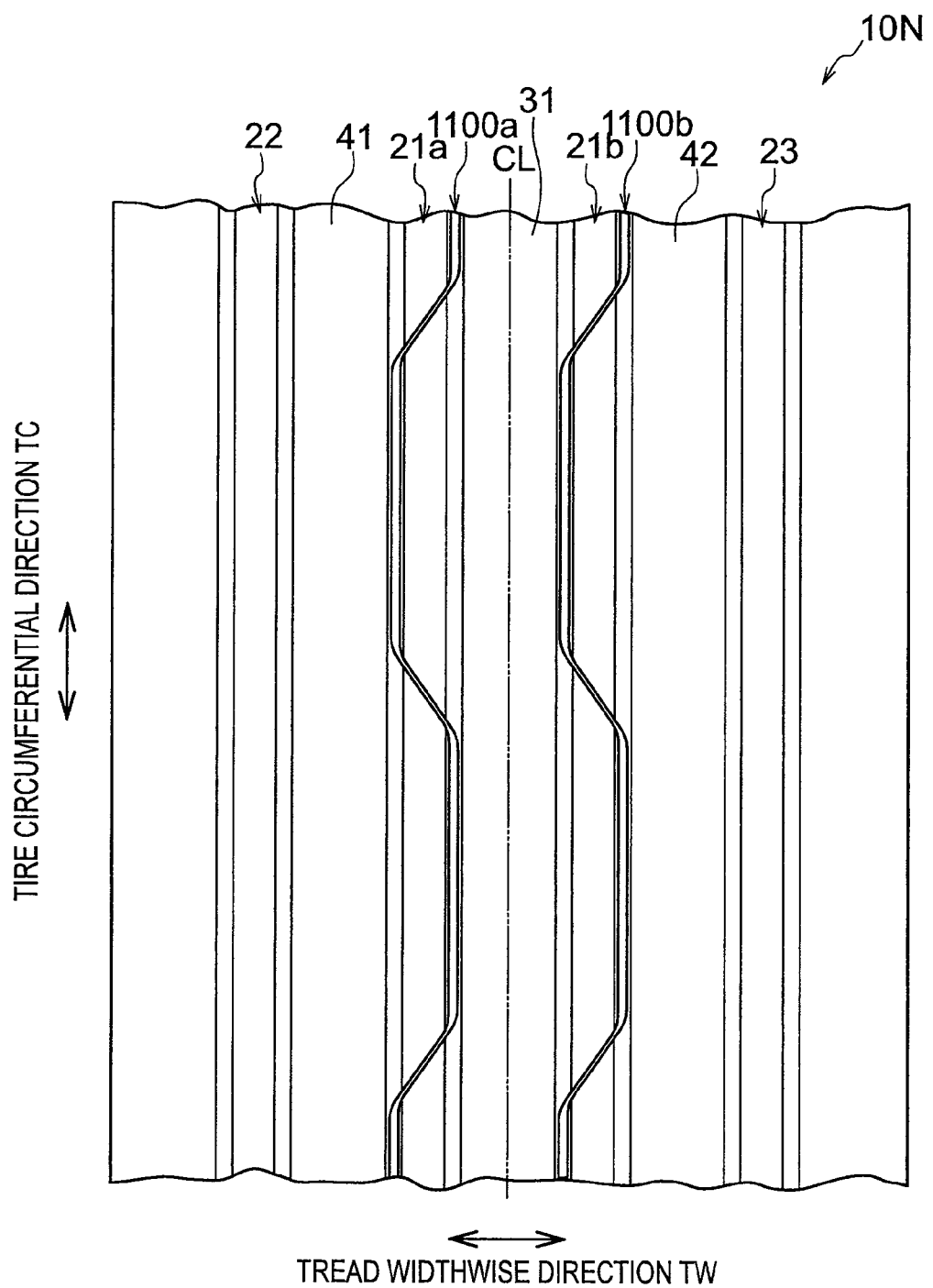
FIG. 22 is a partial exploded view of a tread portion of a pneumatic tire 10N according to another embodiment of the present invention.

Furthermore, FIG. 22 is a partial exploded view of a tread portion of a pneumatic tire 10N according to another embodiment of the present invention. As shown in FIG. 22, the intra-groove 1100 formed in the main groove 21a, and the intra-groove 1100 formed in the main groove 21b may be formed in parallel with the tire equator CL as the boundary. In such a case, the intra-groove 1100a and the intra-groove 1100b can be prevented from being formed at the same position in the tire circumferential direction Tc of the land portion 31, because of which the decline in the rigidity of the land portion 31 can be suppressed.

Other Embodiments

As described above, although the content of the present invention was disclosed through the embodiments of the present invention, the descriptions and drawings that form a part of this disclosure are not to be considered as limitation to the present invention. From this disclosure, a variety of alternate embodiments, examples, and applicable techniques will become apparent to one skilled in the art.

Moreover, it is also possible to combine the embodiments with the modifications mentioned above. As described above, needless to say, the present invention includes various embodiments and the like not described here. Therefore, the technical range of the present invention is to be defined only by the inventive specific matter according to the adequate claims from the above description.

INDUSTRIAL APPLICABILITY

Thus, the tire according to the present invention can further reduce the tire noise such as the pattern noise and road noise, while securing a water discharge performance, and is therefore useful.

The invention claimed is:

1. A tire provided with a plurality of land portions formed by a main groove extending along a tire circumferential direction, wherein
   the land portions include a first land portion having a first groove wall forming one wall surface of the main groove, and a second land portion having a second groove wall forming the other wall surface of the main groove,
   the main groove is formed with one intra-groove recessed in a tire inner direction from a surface of the main groove, the intra-groove being extended along the tire circumferential direction,
   the intra-groove comprises:
   a first circumferential groove portion extending along the tire circumferential direction on the first groove wall;
   a first inclined portion extending from the first groove wall toward the second groove wall on a groove bottom of the main groove, the first inclined portion being inclined with respect to the tire circumferential direction;
   a second circumferential groove portion extending along the tire circumferential direction on the second groove wall; and
   a second inclined portion extending from the second groove wall toward the first groove wall on the groove bottom of the main groove, the second inclined portion being inclined with respect to the tire circumferential direction,
   a groove width of the first circumferential groove portion and a groove width of the second circumferential groove portion are different from a groove width of a first inclined portion and a groove width of a second inclined portion, and
   the first circumferential groove portion, the first inclined portion, the second circumferential groove portion, and the second inclined portion are formed repeatedly along the tire circumferential direction.

2. The tire according to claim 1, wherein
   the groove width of the first circumferential groove portion and the groove width of the second circumferential groove portion are narrower than the groove width of the first inclined portion and the groove width of the second inclined portion.

3. The tire according to claim 1, wherein
   the groove width of the first circumferential groove portion and the groove width of the second circumferential groove portion are broader than the groove width of the first inclined portion and the groove width of the second inclined portion.

4. The tire according to claim 1, wherein
the intra-groove is formed across an entire circumference of the main groove.

5. The tire according to claim 1, wherein
the first circumferential groove portion and the second circumferential groove portion are formed in an outer side in a tread widthwise direction from a center in the tread widthwise direction of the main groove.

6. The tire according to claim 1, wherein
the first circumferential groove portion and the second circumferential groove portion are formed alternately along the tire circumferential direction, the first circumferential groove portion is formed at one outer side in the tread widthwise direction from the center in the tread widthwise direction of the main groove, and the second circumferential groove portion is formed at the other outer side in the tread widthwise direction from the center in the tread widthwise direction of the main groove.

* * * * *